United States Patent
Deprez et al.

(10) Patent No.: US 7,665,808 B2
(45) Date of Patent: Feb. 23, 2010

(54) METHOD AND DEVICE FOR AUTOMATICALLY RELEASING THE AUTOMATIC PARKING BRAKE WHEN STARTING

(75) Inventors: Philippe Deprez, Versailles (FR); Emmanuel Devaud, Clamart (FR); Philippe Planchon, Paris (FR)

(73) Assignee: Renault S.A.S., Boulogne Billancourt (FR)

( * ) Notice: Subject to any disclaimer, the term of this patent is extended or adjusted under 35 U.S.C. 154(b) by 770 days.

(21) Appl. No.: 10/518,036

(22) PCT Filed: Jun. 20, 2003

(86) PCT No.: PCT/FR03/01897

§ 371 (c)(1),
(2), (4) Date: Aug. 5, 2005

(87) PCT Pub. No.: WO04/000622

PCT Pub. Date: Dec. 31, 2003

(65) Prior Publication Data

US 2006/0049691 A1 Mar. 9, 2006

(30) Foreign Application Priority Data

Jun. 20, 2002 (FR) .................. 02 07623

(51) Int. Cl.
*B60T 8/32* (2006.01)
*G06F 19/00* (2006.01)

(52) U.S. Cl. .................. 303/192; 303/20; 188/DIG. 2; 192/219.1

(58) Field of Classification Search ................ 303/191, 303/192, 198, 155, 15, 20; 188/DIG. 2, 265; 192/215, 220, 223, 219.1; 701/70, 78, 87
See application file for complete search history.

(56) References Cited

U.S. PATENT DOCUMENTS

| | | | | |
|---|---|---|---|---|
| 4,561,527 A | * | 12/1985 | Nakamoto et al. | 192/219.4 |
| 6,019,436 A | * | 2/2000 | Siepker | 303/13 |
| 6,302,823 B1 | * | 10/2001 | Eckert et al. | 477/186 |
| 6,439,675 B1 | * | 8/2002 | Zechmann et al. | 303/191 |
| 2002/0033642 A1 | * | 3/2002 | Holl | 303/191 |

FOREIGN PATENT DOCUMENTS

| | | |
|---|---|---|
| DE | 15 80 720 | 6/1970 |
| DE | 199 12 878 | 4/2000 |
| DE | 198 49 799 | 6/2000 |
| DE | 199 31 345 | 12/2000 |
| GB | 2 342 967 | 4/2000 |
| WO | 89/01887 | 3/1989 |

\* cited by examiner

*Primary Examiner*—Melody M Burch
(74) *Attorney, Agent, or Firm*—Oblon, Spivak, McClelland, Maier & Neustadt, L.L.P.

(57) ABSTRACT

A method and a device for automatically releasing an automatic parking brake at start-up. A transmitted torque estimation threshold value is determined that enables the vehicle movement to be balanced. Then, at start-up a loop for calculating the transmitted torque estimation is carried out so long as the calculated value does not exceed the threshold value. When the threshold is exceeded, an automatic parking brake-release command is produced.

19 Claims, 7 Drawing Sheets

METHOD AND DEVICE FOR AUTOMATICALLY RELEASING THE AUTOMATIC PARKING BRAKE WHEN STARTING

BACKGROUND OF THE INVENTION

I. Field of the Invention

This invention concerns a method and device for automatically releasing the automatic parking brake when starting.

II. Description of Related Art

In the state of the art, making electric parking brakes which replace manual parking brakes has previously been proposed.

The electric parking brake is connected to a computer which, depending on different operating signals of the vehicle, permits its automatic release without the driver's direct intervention.

In the state of the art, a system of assistance to starting on a hill, using the automatic parking brake, has also been proposed, which is based on detection notably of the degree of depression of the clutch pedal, in order to deduce therefrom the engine torque available to the wheel, on the one hand, and for the aid of the driver, on the other, in starting the vehicle, when the latter is maintained on the slope by operation of the automatic parking brake.

The above system operates correctly.

However, the inventors found that the solution had a rather high cost which it was desirable to reduce. They realized that eliminating the clutch pedal position detector is a way of reducing that cost.

Along the same lines, in the solution previously developed, use of the information on the clutch pedal position has to be converted into a torque value transmitted to the wheel, which notably complicates the means of calculation of the automatic parking break release controller when the latter is working to assist starting on a hill.

BRIEF SUMMARY OF THE INVENTION

In order to remedy those problems of the state of the art, this invention concerns a method of assistance in starting a vehicle containing a power unit and an Automatic Parking Break equipped with a means of executing a command to release or deactivate the parking brake. The method of the invention consists in executing, at least after a starting phase of the power unit:

A stage of estimation of a transmitted torque value which balances the vehicle on the slope;

A loop consisting in executing an incremental calculation of an estimation of the torque really transmitted at a given instant, while the estimation of the torque really transmitted is insufficient to surpass the estimation of the torque transmitted; and then A stage of production of a starting or deactivation command of the Automatic Parking Brake.

According to one aspect of the method, the stage of estimation of a transmitted torque value which balances the vehicle on the slope includes a stage for calculating a static model of the vehicle on the slope from a measurement of an angle of inclination delivered by a slope sensor and knowledge of a given value representative of the transmission speed.

According to one aspect of the method, the measurement of an angle of inclination being less than a given threshold, the estimation of a transmitted torque value which balances the vehicle on the slope is increased by a given value.

According to one aspect of the method, the given value of increase of the estimation of a transmitted torque value which balances the vehicle on the slope depends on measurement of the angle of inclination;

According to one aspect of the method, the stage of incremental calculation comprises:

a stage of reading of an effective average torque value associated with the dynamic state of the power unit;

a stage of reading of an engine speed value;

a stage of calculation of the time derivative of the engine speed;

a stage of determination of the moment of inertia of the power unit and of calculation of the load moment in the form of a product of the moment of inertia of the power unit by the time derivative of the engine speed;

a stage of determination of an estimation of transmitted torque according to an equation of the form: $ECT = Cme - Jmot \times dWm/dt$.

According to one aspect of the method, there is a stage of resynchronization of the reading of an effective average torque value and of an engine speed value, so that each pair of values (Cme, Wm) corresponds to the same time interval.

According to one aspect of the method, it is arranged to add a predetermined delay, preferably equal to three periods of passage to the Top Dead Center of the thermal engine of the power unit, on the value of resynchronization of the estimated average torque value, in order to take into account notably the waiting time for filling of the manifold and for ignition.

According to one aspect of the method, the resynchronization stage consists in applying the resynchronization on the derivative value D_Wm of the engine speed Wm between two samples separated by a resynchronization time notably according to the equation: $D\_Wm = [Wm(8) - Wm(1)]/time$, in which "time" determines the resynchronization period and Wm(1) and Wm(8) the values of beginning and end of the resynchronization period.

According to one aspect of the method, the transmitted torque estimation stage (ECT) comprises the comparison of a transmitted torque estimation value (ECT) to a predetermined threshold value (ECTthreshold), so that if the threshold is exceeded in a test of a counter incremented on each transmitted torque estimation stage (ECT) relative to a predetermined threshold (Smin_loop_Delay), so that if the threshold on the counter is exceeded, a command authorizing release of the Automatic Parking Brake is generated.

According to one aspect of the method, the transmitted torque estimation stage ECT further comprises a predetermined offset stage, so as to reduce the disturbing effect of starting and stopping of some secondary consumers (Consumers) of energy or power supplied by the thermal engine, by carrying out the operation:

$$ECT\_Corr\_k = ECT\_k + g(\text{Consumers})$$

so that the range in which the engine can be considered idling and the range during which an offset g(Consumers) on the transmitted torque estimation can be realized may be determined. According to the invention, four criteria or tests are carried out simultaneously in order to arrive at such an offset.

According to one aspect of the method, the offset is effected at the conclusion of a test during which four conditions are combined:

$Wm \leq Smax\_Wm\_Idle$ $ABS(D\_Wm) \leq Smax\_D\_M\_idle$ $THETA\_Acc \leq Smax\_acc\_idle$ $D\_Acc \leq 0$.

Conditions under which:

Smax_Wm_idle represents a threshold value below which the engine speed indicates that the engine is at rest or idling;

Smax_D_M_idle represents a threshold value below which the absolute value ABS(D_Wm) of the time derivative of the engine speed D_Wm indicates that the engine is at rest or idling;

Smax_acc_idle represents a threshold value below which the degree of depression of the accelerator pedal THETA_Acc indicates that the engine is at rest or idling;

D_Acc represents the time derivative of the degree of depression THETA_Acc of the accelerator pedal, which is negative when the driver lifts his foot from the accelerator pedal, so that, if the test is negative, the control returns to initialization of a counter CPTR, the power unit being deemed unconnected to the driving wheels, and so that, if the test is positive, the control passes to a test where one looks whether the counter CPTR is below a predetermined threshold value CPTR_threshold, so that if the test is positive, the control passes to a stage in the course of which an initially zero "offset" value, when the counter CPTR is itself initialized at the stage, is increased by the value of the current estimation ECT;

then, the value of the counter CPTR being incremented by one step on a stage, the control returns to the test stage;

so that, if the test is negative, the offset value is transmitted to a routine of calculation of an offset value of the transmitted torque estimation ECT, an offset value noted "offset_ECT", which is equal to the ratio of the "offset" value calculated on the stage to the value CPTR of the counter which at that time equals CPT_threshold.

According to one aspect of the method, a stage is executed to produce a driver activity report, so that release of the Automatic Parking Brake will be refused in case of lifting of the accelerator pedal.

According to one aspect of the method, a stage is executed to detect a release demand when the power unit is not engaged.

According to one aspect of the method, the stage consists, without using any sensor of depression of the clutch pedal, in detecting the engaged state by means of two maps of the estimation of torque transmitted as a function of the degree of depression of the accelerator pedal respectively established when the wheels are engaged and when the wheels are disengaged and comparing the value of the estimation of torque transmitted to each of the map values addressed by measurement of the degree of depression of the accelerator pedal in order to produce, if comparison to the first map is positive, a characteristic report of a disengaged state, and if the comparison to the second map is positive, to produce a characteristic report of an engaged state.

According to one aspect of the method, the stage consists in producing, by use of a sensor of depression of the all-or-nothing clutch pedal, a characteristic report of an engaged or disengaged state.

According to one aspect of the method, a stage for detecting idling speed consists in:
comparing the information on estimated engine torque Cme to two functions of estimation of idling speed in positive rotation fp( ) and in negative rotation fn( );
applying to function fp( ) an idle gain G_Cme_PV applied on the estimated engine torque Cme, an Offset_Cme_PV on the estimated engine torque value in idle position, and the current value CME in order to produce a priori an idling speed value in positive rotation;
applying to function fn( ) an idle gain G_Cme_NV applied on the estimated engine torque Cme, an Offset_Cme_NV on the estimated engine torque value in idle position, and the current value CME in order to produce a priori an idling speed value in negative rotation;
comparing the engine speed value (Wm) to determine whether a positive or negative idling speed is present;
authorizing release of the Automatic Parking Brake only if no idling speed is detected.

According to one aspect of the method, a stage of saturation detection of the high-speed thermal engine is executed, so that release of the Automatic Parking Brake is prevented on saturation.

According to one aspect of the method, a stage for producing a "horizontal" starting operation without threshold on pressing the accelerator pedal consists in:
producing a parking brake release command on the sole determination that the transmitted torque estimation ECT is higher than the predetermined threshold ECT-threshold and, in particular, without testing a threshold on pressing the accelerator pedal;
initializing a state variable on starting up the vehicle in order to indicate that the accelerator pedal has not yet been depressed, the variable being represented by Acc_Was_NonZero=0;
reading a variable representative of the state of rest of the engine (Idle);
treating the variable Acc_Was_NonZero so that it stays at "1" as soon as the accelerator has been pressed and until the Idle variable returns to "1";

and then consists in authorizing "horizontal" starting when the variable Acc_Was_NonZero equals "0" and of testing that the transmitted torque estimation ECT is higher than a threshold value ECTthreshold in order to authorize release of the Automatic Parking Brake and thus ensure starting of the vehicle keeping it in a certain range of acceleration.

According to one aspect of the method, the "horizontal" starting operation is extended to a descending starting operation in first gear.

According to one aspect of the method, the "horizontal" starting operation is extended to a descending starting operation in reverse gear.

According to one aspect of the method, an excess pitch detection stage and a stage for preventing release of the Automatic Parking Brake in a starting situation if the pitch of the vehicle applied, for example, by too great a movement of the passengers in the vehicle exceeds a certain predetermined threshold.

According to one aspect of the method, a stage for determining a term of anticipation of the release command of the Automatic Parking Brake dependent on predetermined anticipation values which consists, upon elaboration of the Automatic Parking Brake release command, in also executing a stage of measurement of the degree of depression of the accelerator pedal Teta_Acc, and then measuring a time derivative of the signal Teta_Acc of the degree of depression, that is, D_Acc, and comparing that instantaneous derivative value D_Acc with a predetermined threshold Threshold_Anticipate, so that if the rate of variation of the degree of depression D_Acc is greater than a Threshold_Anticipate value, the incrementation loop of the transmitted torque estimation value ECT will be interrupted before the test is real and in order to produce in advance the Automatic Parking Brake release command.

The invention also concerns a device to assist on-hill starting of a vehicle containing a power unit and an Automatic Parking Brake equipped with a means of executing a parking brake release or deactivation command. The device of the invention essentially contains a computer of a release command connected to a sensor of the degree of slope on which the vehicle is engaged and to a sensor delivering information on the speed or rate of rotation of the power unit of the vehicle.

The invention is characterized in that the computer contains a means of estimation of the transmitted torque connected to a first input of a means of comparison, a second input of which is connected to a means for producing a transmitted torque threshold value corresponding to maintenance of the vehicle, so that an output terminal of said means of comparison produces a release command addressed to the electric parking brake according to the method of the invention.

BRIEF DESCRIPTION OF THE DRAWINGS

Other characteristics and advantages of the invention will be better understood by means of the description and attached figures, which are.

DETAILED DESCRIPTION OF THE INVENTION

Figure 1:
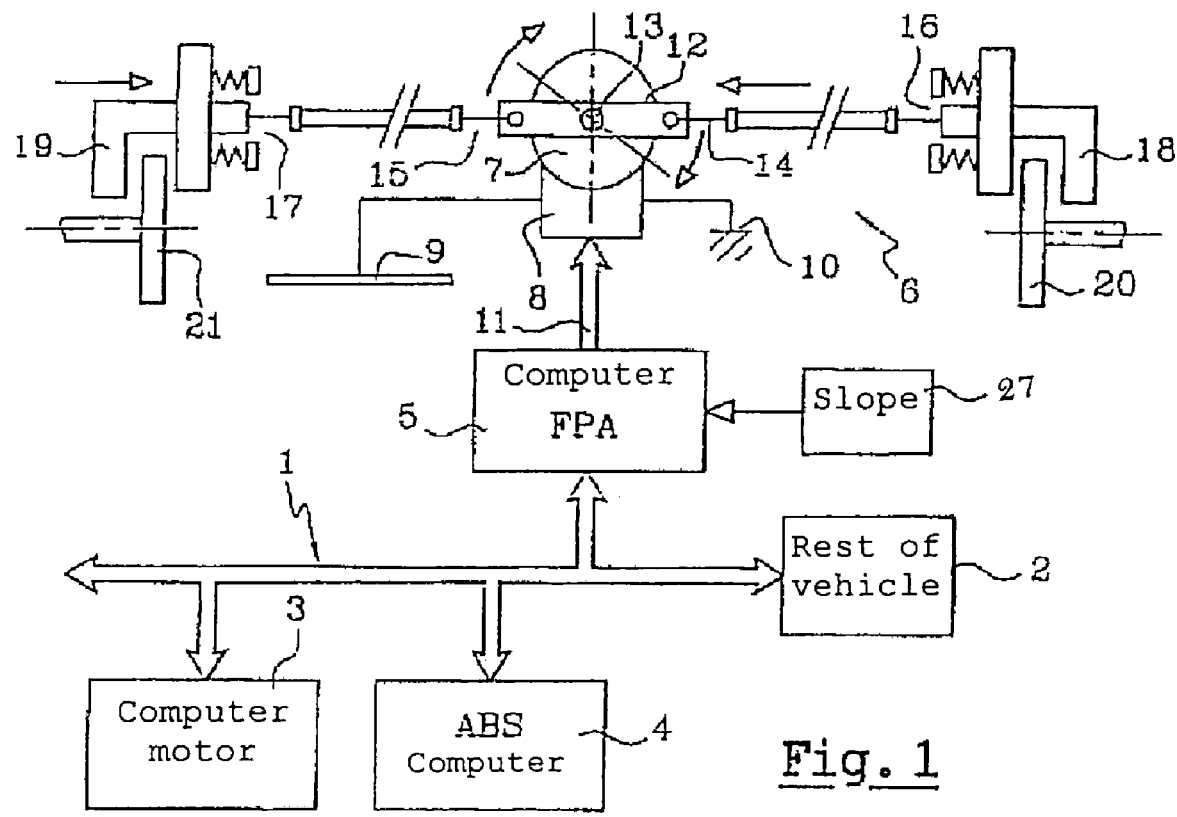
FIG. 1: a block diagram representing a device according to the invention.

On FIG. 1 a device to assist starting on a hill is represented in an embodiment of the invention. The vehicle on which the device and the electric parking brake are installed contains a bus 1 over which signals pass, emanating from the rest of the vehicle 2, from a power unit control computer 3 and from a braking control computer 4, for example of type ABS™. The bus 1 is a bus of CAN™ standard in a working example. The power unit is composed of a thermal engine coupled to drive wheels by a transmission device containing a gearbox and a clutch which can be controlled automatically and/or by the driver. In other embodiments the power unit can contain one or more electric machines with or without a thermal engine.

The device to assist starting on a hill cooperates with a computer 5 controlling the Automatic Parking Brake 6, which is also connected to the bus 1. The control computer 5 is equipped, as is known, with a means of producing an Automatic Parking Brake locking command and with a means of producing an Automatic Parking Brake release command, said locking or release commands being generated on a line of connection 11 to the Automatic Parking Brake proper. If need be, the control computer 5 is also equipped with a means of returning to the bus 1 of the vehicle information on the state of the Automatic Parking Brake.

The computer 5 controlling the Automatic Parking Brake is connected by a suitable line with a slope sensor 27. In other embodiments, information on the degree of slope being available on the bus 1, the sensor 27 is replaced by an equivalent means which picks up that information from the data flow passing over the bus 1.

The Automatic Parking Brake used in the invention mainly contains an electric motor 7 which is controlled by an electric motor controller 8, the electric power supply of which is connected to the supply system of the vehicle 9 and to ground 10, and the command parameters of which (current, voltage or speed and torque) are transmitted by the command line 11 coupled to the control computer 5 of the Automatic Parking Brake.

The electric motor 7 cooperates, as is known, with a suitable reducing gear (not represented), which drives a mechanism 12 schematically represented on FIG. 1 in the form of a bar mounted on the drive shaft 13 and the ends of which bear cables 14 and 15 respectively, which are respectively connected at their ends to a braking control part 16 for a right wheel and to a braking control part 17 for a left wheel.

When the computer 5 controlling the Automatic Parking Brake produces a locking command, a command activating the electric motor 7 is transmitted by line 11 to the controller 8, which sets the electric motor 7 in rotation, so that the lever 12 pulls the cables 14 and 15 with a given tightening stress.

The moving parts 18 and 19 of the brakes 16 and 17 squeeze the disks 20 and 21, so that the Automatic Parking Brake will be tightened.

When the computer 5 controlling the Automatic Parking Brake produces on line 11 a command releasing the Automatic Parking Brake, the rotation of the electric motor 7 is driven in the other direction and the moving parts 18 and 19 of the brakes 16 and 17 are loosened.

By using the device of the invention, when the vehicle is stopped on a ramp, the slope sensor 27 delivers a signal representing the degree of slope on which the vehicle is stopped.

Furthermore, in a situation of starting on a hill, the power unit of the vehicle produces a torque which is transmitted or not to the wheels, depending on whether the clutch is active or not and depending on a fraction subject to the clutch position.

As will be seen presently, the principle of the invention consists in determining an Automatic Parking Brake release condition, so that the computer 5 controlling the Automatic Parking Brake, depending on the slope measured by the sensor 27 and on the engine speed presented on the bus 1, produces a command releasing the Automatic Parking Brake, so that with the slope effect being balanced by the engine torque, the vehicle can be in a starting position as soon as the threshold is exceeded.

Figure 2:
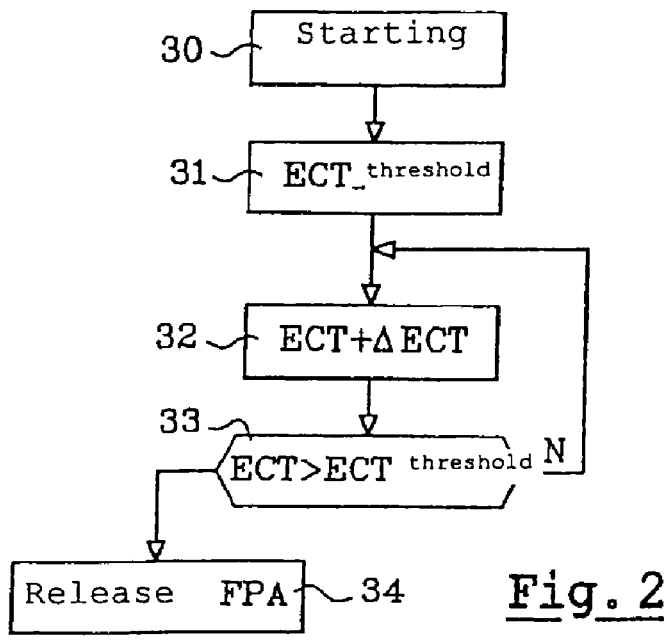
FIG. 2: a flow chart representing the principal stages of the method of the invention.

On FIG. 2 a flow chart is represented, showing the principle stages of the method of assistance upon starting on a hill according to the invention.

In a stage 30 a power unit start-up stage is created, then notably when the vehicle is stopped, with the Automatic Parking Brake locked, a stage of initialization of the computer 5 controlling the Automatic Parking Brake.

The control then passes to a stage 31 of determination of an estimation of the transmitted torque corresponding to the threshold from which the Automatic Parking Brake can be released without the vehicle undergoing a backward movement.

The control next passes to a stage 32 in the course of which there are calculated an estimation of the torque transmitted from the moment of starting, on the one hand, and an offset or increase of transmitted torque which makes it possible to balance the estimation of torque transmitted from threshold and resulting both from the acceleration action and the clutch action in the case of a standard vehicle with clutch and accelerator pedal, or by equivalent means in cases of vehicles of other types.

For that purpose, the control passes to a test 33 where the new estimation value of the transmitted torque calculated on stage 32 is compared to the threshold value established on stage 31. If the test is positive, on a stage 34, the computer 5 controlling the Automatic Parking Brake is programmed to produce a release command. If the test is negative, the calculation of a new estimated transmitted torque value is executed on stage 32 and the test resumes on loop.

The stage 31 of calculation of a threshold value on the transmitted torque estimation is now going to be described. That threshold value is defined from a static model of the vehicle, as well as on the idea that the transmission speed applied by the transmission device inserted between the wheels and the power unit is placed on a given transmission speed value, like a first gear R1 of a gearbox with multistage speeds.

In other embodiments the device for assisting starting on a hill cooperates with a means of detection of the transmission speed and, in particular, for a transmission with multistage speeds, a means of detection of the position of the gear lever, in order to detect whether the vehicle is placed in reverse or in other transmission speeds, which makes it possible to increase the sensitivity of the assistance device depending on detection of the driver's intention, if it is desired to start in speeds other than first.

By designating with p the transmission speed, R the wheel radius, α the slope on which the vehicle is located, M the weight of the vehicle and g the gravitation constant, the threshold value of the transmitted torque estimation is defined by a product of terms of the form:

$$ECT_{threshold}=M*g*\sin(\alpha)*p$$

The threshold value thus calculated indicates the torque it is necessary to apply to the wheel so as to keep the vehicle in balance on the slope. It is clear that from this threshold value, any increase of transmitted torque would enable the vehicle to start. It is therefore possible to produce from this threshold value a parking brake release command.

The method and device for assisting starting on a hill according to the invention thus make it possible, through an estimation of transmitted torque, to make the vehicle start on a hill without any intervention by the driver on the parking brake control, on the one hand, and without any backward movement of the vehicle on starting, on the other.

In an embodiment it was observed that when the slope sensor produced a very low degree of slope α, that is, when the hill is not very steep, the assistance device finds a threshold value of the estimation of transmission torque $ECT_{threshold}$ very close to 0, and the vehicle then, when the brake is released, can be set in motion parasitically.

To avoid this situation, an increment value f is added, which depends on the slope values detected and which, when the slopes are slight, makes it possible to increase the threshold value of the estimation of transmitted torque. In this embodiment the computer 5 contains a means for determining whether the degree of slope is less than a given value and, on the positive response of this determination, to add to the determination of the already described means of the threshold value of the estimation of transmitted torque $ECT_{threshold}$ a term determined as a function of the degree of slope α, that is, f(α). In an embodiment the calculation module of the threshold value of the transmitted torque estimation therefore further includes a map memory which contains a plurality of addresses, one for each discrete value produced by a suitable slope sensor, and each address containing a numerical value representing the supplementary value to be added to the transmitted torque threshold when the degree of slope α is slight, and a module adding said supplementary value read on the map memory with the value previously calculated from the static data representing the statics of the vehicle on the slope and in order to produce a corrected value of the estimation of transmitted torque threshold of equilibrium.

In one particular embodiment the term f(α) is also valid outside slight slopes in order to add approval of driving and/or of safety. Its effect is then to secure the vehicle somewhat more on starting.

In order to execute stage 32 of the method of the invention, the computer 5 controlling the Automatic Parking Brake contains:

a first reading module of the effective average torque Cme supplied by the computer of the engine 3 in the form of information circulating on the bus 1 of the vehicle, a second reading module of the instantaneous speed Wm of rotation of the thermal engine supplied by the computer of the engine 3 in the form of information circulating on the bus 1 of the vehicle, a third module making it possible to calculate the time derivative dWm/dt of the rate of rotation on output of the power unit from the datum of rate of rotation or engine speed retrieved by the second module;

a fourth module for calculating the product of a value of the moment of inertia Jmot characteristic of the inertia of the engine, as well as the output value of said third module;

a fifth module for subtracting the output value of the fourth module, presented at a subtraction input of the fifth module, from the output value of the said first module, so that on its output an instantaneous value of the instantaneous estimation of transmitted torque produced is presented according to an equation: ECT=Cme−Jmot× dWm/dt.

Figure 3:
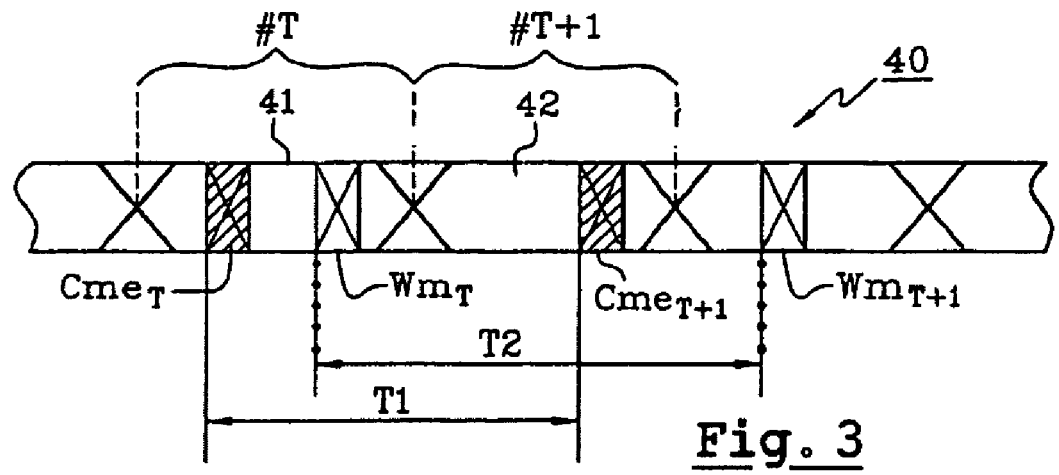
FIGS. 3 to 5: diagrams explaining an embodiment making it possible to prepare the calculation of an estimation of the transmitted torque.

On FIG. 3 a diagram is represented, which explains a cause of error on the estimation of transmitted torque and on the engine speed.

In the upper part of FIG. 3, a timing diagram 40 is represented, showing successive fields 41 and 42 corresponding to referenced periods #T and #T+1. At the end of each of these fields, a set of transmitted data is available on the different receivers.

In each field the member data are structured according to a protocol registered by a protocol control circuit on the CAN bus in numeric words representing values of parameters transmitted on the bus and inserted with different phases and periodicities.

Thus, in the example illustrated on FIG. 3, on field 41 of period #T, a first word $Cme_T$ of a first variable transmitted and a second word $Wm_T$ of a second variable transmitted will both be available at the end of field #T. But, because of periods T1 and T2 for the first and second words transmitted different from and/or greater than the period of the field, or also because the latter varies, only the first word $Cme_{T+1}$, is available at the end of field #T+1. The second word provided for field T+1 is received on a subsequent field 43 under the word $Wm_{T+1}$.

In the invention it is necessary for the computer 3 controlling the power unit (see FIG. 2) to produce:

an estimated value of the estimated average torque, inscribed in the form of a numeric word Cme on the CAN bus; and an engine speed value inscribed in the form of another numeric word Wm on the CAN bus.

Owing to the mechanisms of production of each of those two values and the fact of occupation of the transmission field according to the CAN bus protocol, as a result, on a given date t, the computer controlling the Automatic Parking Brake FPA 5 for executing a command 11 to release the Automatic Parking Brake in a situation of starting on a hill does not receive at the same time the two data corresponding to the same date and necessary, which prevents a proper estimation.

To remedy that problem, the invention proposes a means of making a correction on the values Cme of the estimated average torque and Wm of the engine speed, as well as a resetting of the information available as a function of a flow of this data according to the fields transmitted on the CAN 1 bus.

Figure 4:
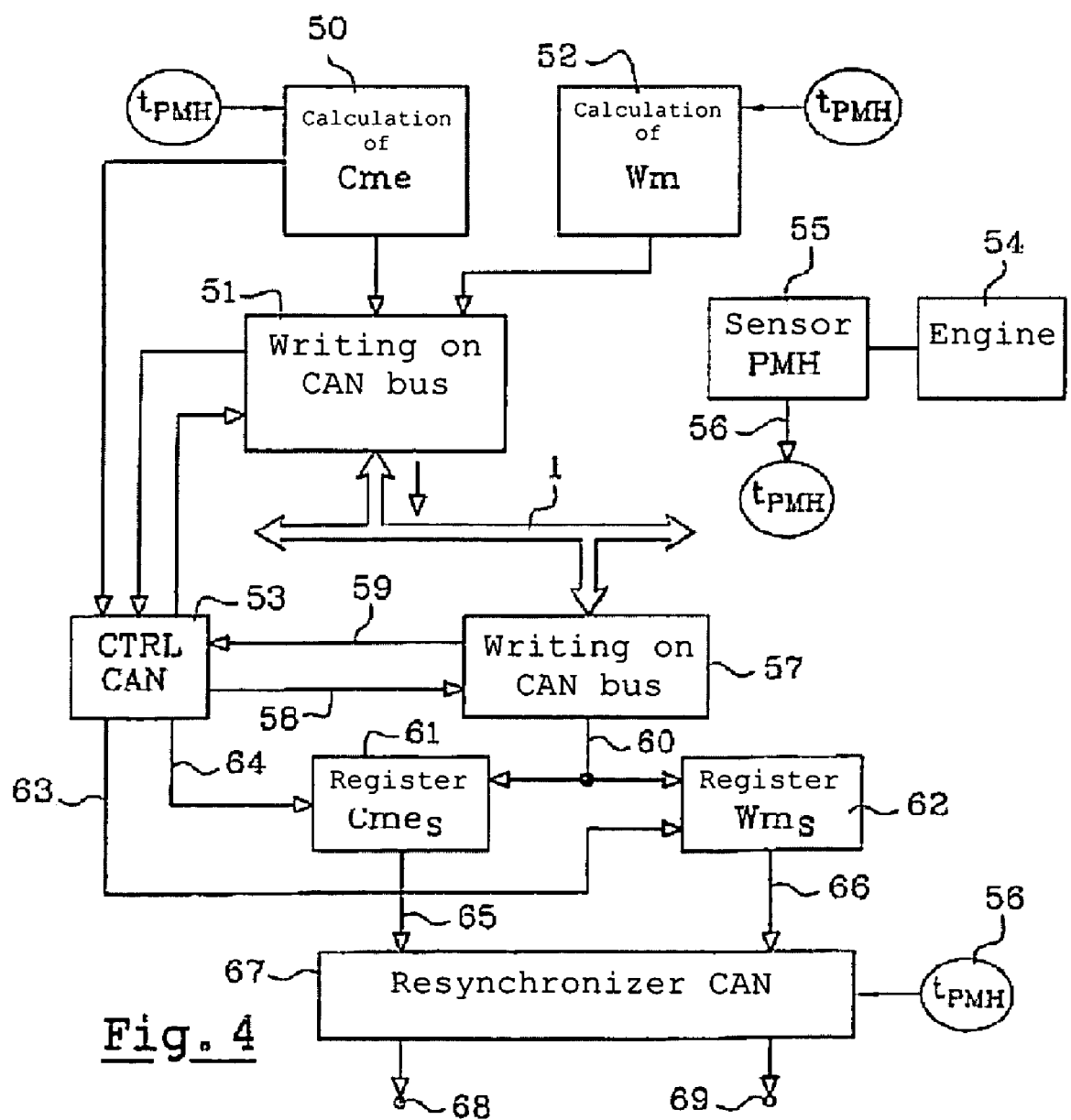

On FIG. 4 a means of calculation of the estimation of transmitted torque 50 transmits an instantaneous value of the estimated average torque Cme to a writing module 51 on the CAN 1 bus, so that, at given moments, an instantaneous value of the estimated average torque speed will be available on the CAN 1 bus.

Furthermore, a calculation module 52 of estimation of the engine speed Wm is connected to an input of the writing module 51 on the CAN 1 bus, so that, at given moments, a value of estimation or measurement of the engine speed will be available on the CAN 1 bus.

For that purpose, information relating to a particular state of the thermal engine, like the instant of top dead center $t_{PMH}$, is supplied to suitable inputs of modules 50 and 52, so as to synchronize the calculations of the first word Cme and second word Wm.

A controller 53 of exchanges on the CAN 1 bus receives information from modules 50 and 52, according to which a new datum is available, the writing module 51 being connected to the controller 53 in order to notify it of a writing operation on the CAN 1 bus and a controller output of the controller 53 being connected to a writing authorization input on the CAN 1 bus of module 51.

The writing module 51 on the CAN 1 bus thus generates a data field as a function of the multiple data it injects on the CAN bus.

The thermal engine represented by reference 54 is coupled to a top dead center sensor 55 in order to generate on its output 56 information $t_{PMH}$ of the top dead center the instant the latter appears.

A reading module 57 on the CAN bus is arranged to receive a reading command through a connection 58 to the CAN bus controller 53 and completes on a line 59 the end of reading of a field.

An output 60 of the reading module 57 makes it possible to transmit respectively to a register 61 the successive values of estimation of the estimated engine torque decoded on the fields received by module 67 and to a register 62 the successive values of engine speed Wm decoded on the fields received by module 67.

The control circuit 53 of the CAN bus contains command outputs, respectively a command output 63 connected to a reading authorization input of the engine speed register 62 and a command output 64 connected to a reading authorization input of the register 61 of transmitted torque estimations, so that the respective outputs 65 of register 61 and 66 of register 62 are connected to the proper inputs of a resynchronization circuit 67, which makes it possible at every instant to maintain a value corrected as a function of the indication of the instant of top dead center $t_{PMH}$ supplied by the output 56 of the sensor 55, of the respective instantaneous values 68 of the estimated average torque and 69 of the engine speed.

The resynchronization circuit 67 has a memory containing a table on a cycle of pairs of output data, so that the serial number of a value representing the first word received on its first input is associated with a serial number of a value representing the serial number of a second word received. The resynchronization circuit 68 also contains registers of sequences of successive values of the first word and/or of the second word and a means, dependent on associations of serial numbers of the aforesaid memory, for applying on output a pair of a first word and a second word corresponding to one and the same moment of calculation. The pair of resynchronized words is then presented on outputs 68 and 69.

Figure 5:
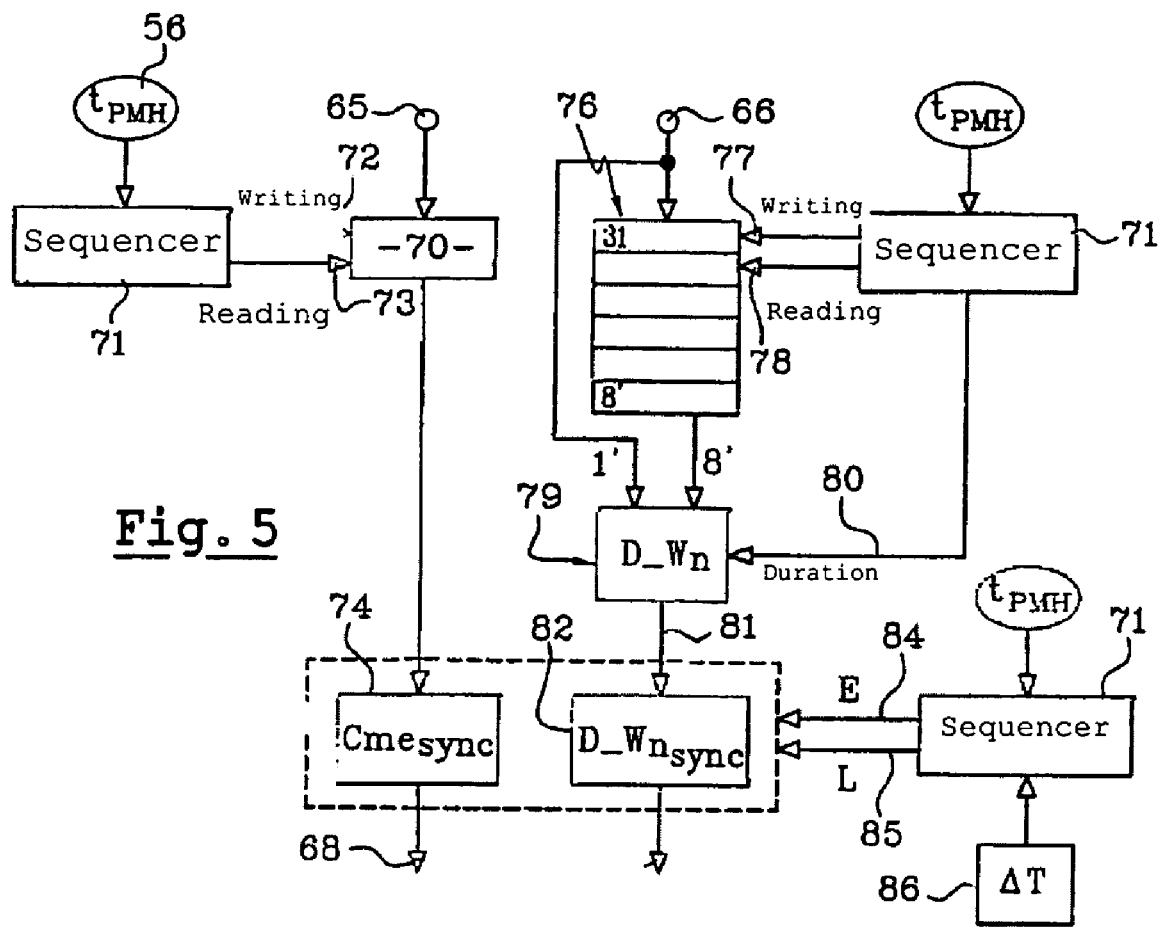

On FIG. 5 an embodiment of a synchronization circuit 67 is represented, which works essentially on the engine speed and makes it possible to use an offset in the mechanism making pairs of words (Cme, Wm) available, corresponding to a characteristic effect on acceleration of the thermal engine, a situation which always occurs when the vehicle is kept on the slope with the Automatic Parking Brake locked.

At the input terminal 65 of the module 67 for synchronization of the data on the CAN 1 bus, the writing input of a synchronization register 70 of the transmitted torque estimation was connected.

For that purpose, a sequencer 71 receives via a suitable input the signal indicating top dead center 56 and transmits writing commands on a line 72 and reading commands on a line 73 directed to writing and reading terminals of the register 70. In the case of a reading signal, the signal corresponds to the engine speed with an offset of a period proportional to the engine speed. That measurement makes it possible to render the information refresh time on the engine speed a function of the value of the engine speed itself.

At a resynchronization moment predetermined relative to the availability indicated on line 72, reading line 73 transmits the value maintained in register 70 to a register 74. Register 74 permanently presents at its output 68 an available value of estimation of the synchronized transmitted torque.

The input terminal 56 of the resynchronization module 67 is connected to the input of a batch 76 of registers in which a plurality of successive values of the engine speed Wm acquired at successive instants on the CAN 1 bus is maintained.

For that purpose, a sequencer 71 contains two writing and reading command outputs 77 and 78 respectively, which make it possible to maintain the plurality of values by placing the most up-to-date value on the first address noted "1" in the batch 76 and by pushing downward the values contained in the following registers of the batch 76.

A subtracting circuit 79 contains:
- a positive input connected to a reading output of the batch 76 on which the oldest value of the engine speed Wm kept in the batch 76 is available, and
- a negative input to which is connected the most recent value of the engine speed also available on the input terminal 66 of the module 67.

An input 80 of the subtracting circuit 79 receives a representative "time" value of the time elapsed on acquisition between the oldest value, like the eighth value "8", noted Wm(1) and received in one particular working example, and the most recent value "1" noted Wm(8), so that a value representing a corrected estimated value of the engine speed is available at the output 81 of the subtracting circuit 79.

$$D\_Wm=[Wm(8)-Wm(1)]/\text{time}.$$

The calculated value available at the output of circuit 79 is loaded in a register 82, so that a value of the time derivative of the synchronized engine speed $D\_Wm_{sync}$ is available at its output 83.

The reading and writing of the registers 74 and 82 are carried out under the control of the sequencer 71, which respectively presents a writing command line 84 and a writing command line 85.

The writing command is carried out under the control of the sequencer 71, which manages a register 86 in which a time offset or delay value ΔT is registered, which corresponds to a desired delay in transmission of values synchronized with the rest of the estimator, so that one can take into account notably:
- the time of filling of the manifold of the thermal engine, and
- the time of ignition when the thermal engine is in acceleration phase, as is the case of on-hill starting.

In a working example the inventors found the best effect when a delay ΔT was applied equivalent to three successive Top Dead Centers before starting synchronization and transfer of the pairs of the first Cme and second Wm or D_Wm words of resynchronized values.

Figure 6:
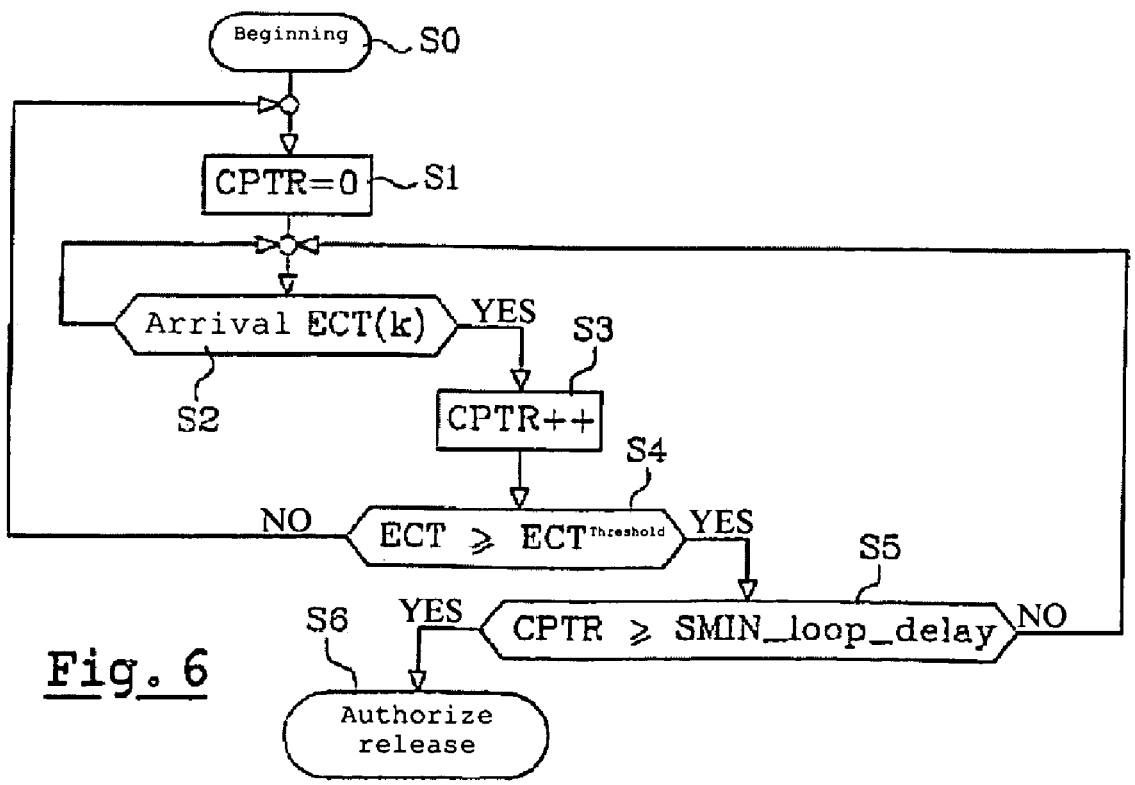
FIGS. 6 and 7: means making it possible to elaborate an electric parking brake release command.

On FIG. 6 one particular embodiment of the method of the invention is represented. The method of the invention consists, upon an initial phase S0, in resynchronizing the data concerning the engine speed and the estimated average torque, calculating the threshold value of the transmitted torque estimation, as described by means of the flow chart of FIG. 2, then repeating the test that the estimation of transmitted torque calculated on the given date is higher than the threshold $ECT_{threshold}$ for at least a predetermined number of samples Smin_Loop_delay.

For that purpose, the counter CPTR is set at an initial value 0 on a stage S1, then the control passes to a standby test S2 of a value ECT_k representing the estimation calculation of the torque transmitted.

When that value is available, the control passes to a stage S3 of incrementation of the counter CPTR and then to a test S4 of estimation of the transmitted torque ECT_k relative to the threshold $ECT_{threshold}$.

If the test is negative, the control returns to initialization of the counter CPT=0 of stage S1.

If test S4 is positive, the control passes to a test S5 where one looks whether the counter CPTR has reached its maximum value Smin_Loop_delay.

If the test is positive, the control passes to a stage S6 in the course of which the computer 5 for control of the Automatic Parking Brake FPA gives a command authorizing release of the parking brake.

If the test S5 is negative, the control returns to the input of test S2 pending arrival of the sample following estimation of the transmitted torque ECT_k.

Figure 7:
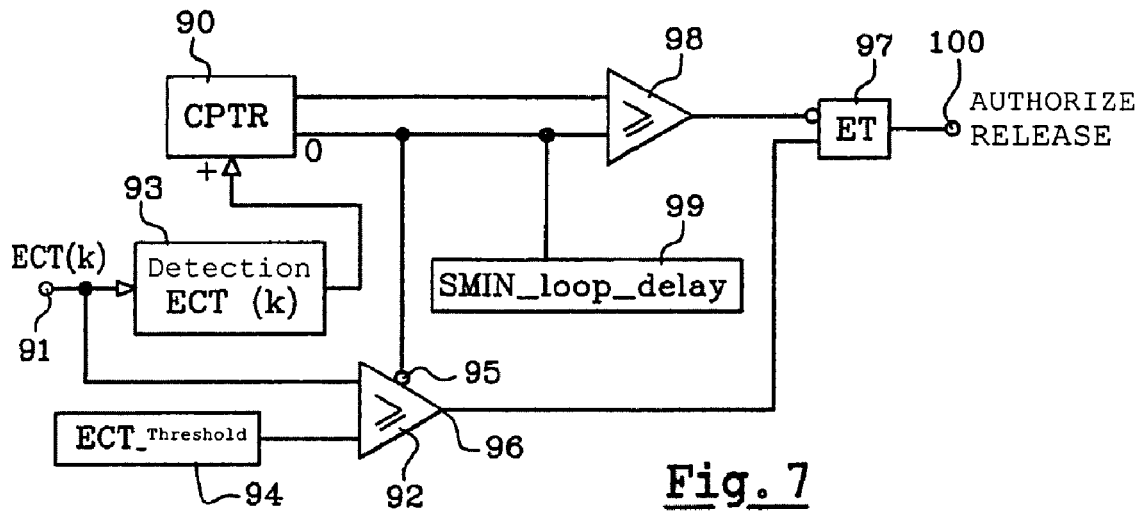

On FIG. 7 an embodiment of a means of calculation of the computer 5 implementing the flow chart of FIG. 6 is represented. That means of calculation of the computer 5 includes a counter 90 which maintains a numeric value CPTR and updates it on each event presented at its input noted "+" by increasing it by a predetermined value like "1". The value CPTR of the counter 90 is then available on a reading output terminal.

The means of calculation of the computer 5 contains an input 91 on which the value ECT_k is loaded and which is connected, on the one hand, to the input of a circuit 93 detecting the arrival of a value ECT_k, and to a first input of a comparator 92.

The detection output of the module 93 for detection of arrival of a sample ECT_k is connected to the incrementation command input '+' of the counter 90, the reading output terminal of which is connected to a first input of a comparator 93.

A threshold value ECTthreshold, maintained in a register 94, is transmitted to a second input of comparator 92.

The comparator 92 contains a first output 96 and a second output 95, complementing one another, so that if the test carried out by the comparator 92 is positive, the first output 96 passes to the active state and is connected to a first input of an AND gate 97, while the second output 95 passes to the inactive state and is connected to an input terminal for reset to an initial value like the value '0' of the counter 90.

The counting value CPTR available in the counter 90 is transmitted to a first input of a second comparator 98, a second input of which is connected to a register 99 maintaining the maximum counting value, at the end of which the release authorization can be executed.

For that purpose, when the test carried out by the second comparator 98 is positive, its output passes to the active state and is connected to a second input of the AND gate 97, so that the output 100 of the AND gate 97 passes to the active state to indicate an authorization of release of the Automatic Parking Brake.

In one particular embodiment the value Smin_Lop_Delay loaded in the register 99 is determined as a function of the period of sampling or loop rate of the algorithm of FIG. 6 and of the time or delay desired between the first overshooting by the estimated transmitted torque value ECT of the threshold value $ECT_{threshold}$ and execution of the release command of the parking brake FPA. According to the invention, the register 99 contains a means of writing of a value so determined of Smin_Lop_Delay, which is activated on initialization of the vehicle or else on its manufacture or on its maintenance with a production tool known to the expert, or else on detection of one type of driver made by means of the vehicle's computer 1 which transmits over the bus 1 a characteristic value of Smin_Lop_Delay associated with the driver detected, for example, by means of the ignition key or of the type of driver according to an algorithm of the type of driving carried out by the driver.

In another particular embodiment not represented in the drawings, the transmitted torque estimation value ECT received at the terminal 91 of the module of FIG. 7 further receives an offset predetermined so as to reduce the disturbing effect of starting and stopping by some secondary consumers of energy or power supplied by the thermal engine. Such an offset is carried out upstream from the circuit 91 of detection and input of the comparator 92 by means of an adder which performs the operation:

$$ECT\_Corr\_k = ECT\_K + g(\text{Consumers})$$

The method of the invention provides a means for determining the range in which the engine can be considered idle and the range during which an offset g(Consumers) on the transmitted torque estimation can be realized. According to the invention, four criteria or tests are performed simultaneously in order to arrive at such an offset.

Figure 8:
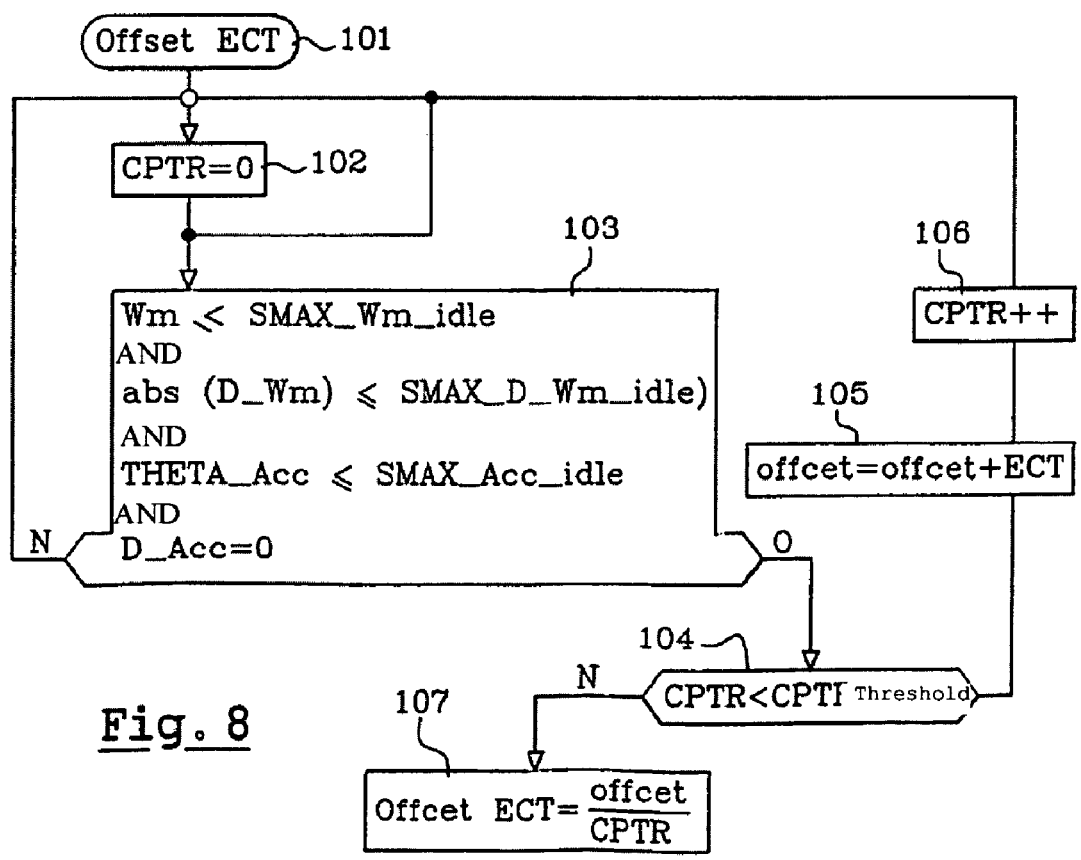
FIGS. 8 and 9: a means of treating the estimation of the transmitted torque generated according to the invention.

On FIG. 8 a flow chart of the method of the invention is represented. The offset calculation entry point 101 makes it possible, on a stage 102, to place a particular counter CPTR at an initial value like value 0. The control then passes to test stage 103 in the course of which four conditions are combined:

$Wm \leq Smax\_Wm\_Idle$ $ABS(d\_Wm) \leq Smax\_D\_M\_idle$ $THETA\_Acc \leq Smax\_acc\_idle$ $D\_Acc \leq 0$.

Conditions under which:

Smax_Wm_idle represents a threshold value below which the engine speed indicates that the engine is at rest or idling;

Smax_D_M_idle represents a threshold value below which the absolute value ABS(D_Wm) of the time derivative of the engine speed D_Wm indicates that the engine is at rest or idling;

Smax_acc_idle represents a threshold value below which the degree of depression of the accelerator pedal THETA_Acc indicates that the engine is at rest or idling;

D_Acc represents the time derivative of the degree of depression THETA_Acc of the accelerator pedal, which is negative when the driver lifts his foot from the accelerator pedal.

If the test 103 is negative, the control returns to initialization 102 of the counter CPTR. The power unit is deemed unconnected to the driving wheels.

If the test 103 is positive, the control passes to a test 104 where one looks whether the counter CPTR is below a pre-determined threshold value CPTR_threshold.

If the test 104 is positive, the control passes to a stage 105 in the course of which an initially zero "offset" value, when the counter CPTR is itself initialized at stage 102, is increased by the value of the current estimation ECT.

Then, the value of the counter CPTR is incremented by one step on a stage 106 and the control returns to the test 103 stage, If the test 104 is negative, the offset value is transmitted to a routine 107 of calculation of an offset value of the transmitted torque estimation ECT, an offset value noted "offset_ECT", which is equal to the ratio of the "offset" value calculated on stage 105 to the value CPTR of the counter which at that time equals CPTR_threshold.

Figure 9:
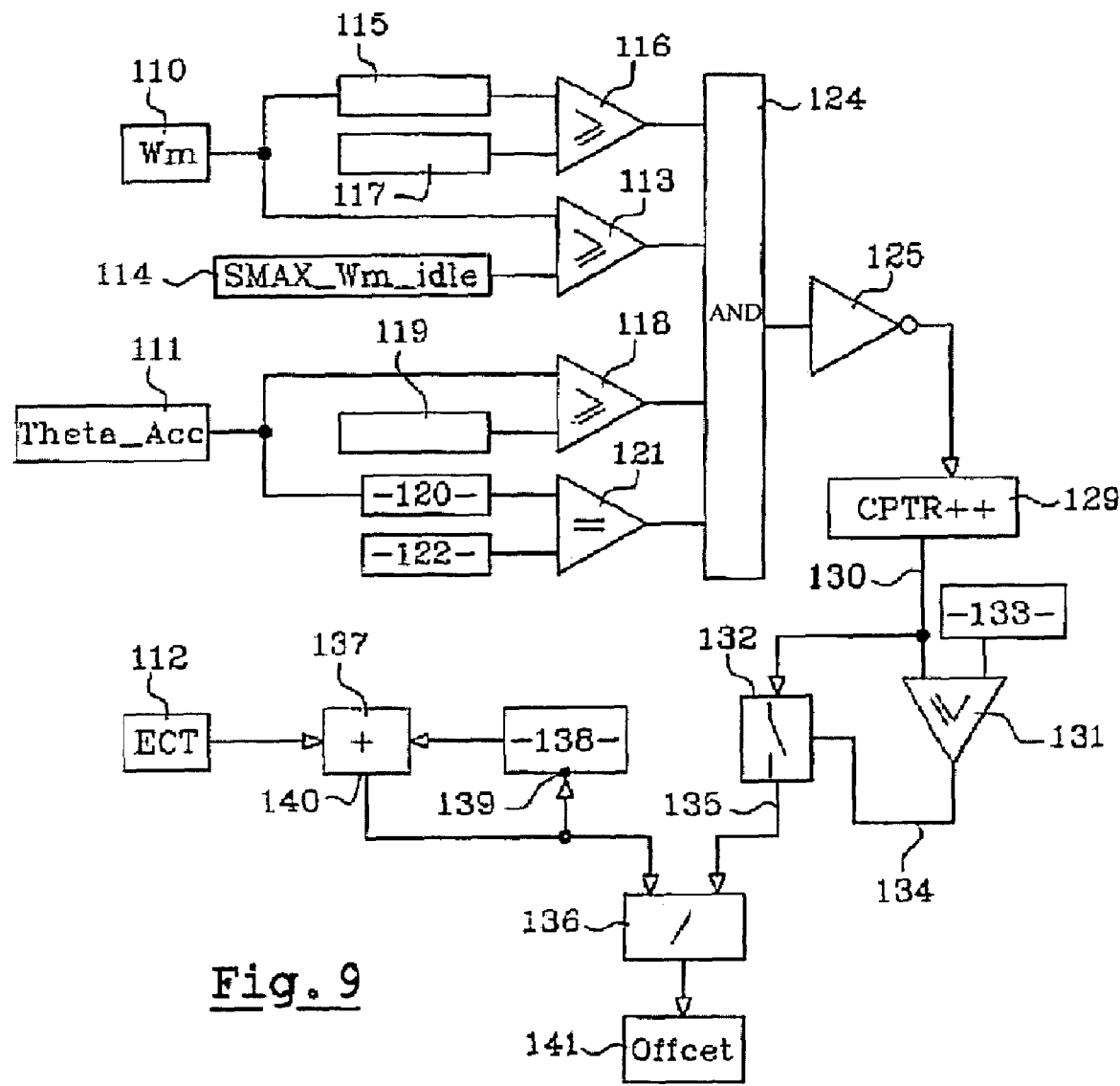

On FIG. 9 an embodiment of a device using the method of the flow chart of FIG. 8 is represented.

The circuit of FIG. 9 contains three input registers, respectively:

register 110 of the instantaneous engine speed value Wm,
register 111 of the degree of depression of the accelerator pedal in a variable THETA_acc,
register 112 which maintains the instantaneous value of estimation of the transmitted torque ECT.

Register 110 contains a reading output connected respectively to a first input of a comparator 113, a second input of which is connected to a register 114 which maintains a higher threshold value Smax_Wm_idle representing the starting speed limit.

Register 110 is also transmitted to an input of a circuit 115 for calculation of the derivative D_Wm of the rate of rotation or engine speed W_m, where one output, on which the absolute value of the time derivative of the engine speed is maintained, is connected to a first input of a comparator 116, a second input of which is connected to the reading output of a register 117, in which the threshold value of variation or time derivative of the engine speed Smax_D_Wm_idle of vehicle starting is maintained.

Register 111, which maintains the angle of depression or stepping on the accelerator pedal THETA_acc, is connected to a first input of a comparator 118, a second input of which is connected to the reading output of a register 119 in which a threshold value Smax_acc_idle is registered, corresponding to a maximum degree of depression of the accelerator pedal in a vehicle starting situation.

The value THETA_acc is also transmitted to a circuit 120 of calculation of the time derivative of depression of the accelerator pedal D_acc, an output of which is transmitted to a first input of a comparator 121.

A second input of the comparator 121 is connected to the reading output of a register 122, in which a threshold value of the acceleration shift is maintained as a zero or roughly zero value so as to detect a situation in which the driver maintains the depression of the accelerator pedal in stable position.

The outputs of the four comparators 116, 113, 118, 121 are connected to the corresponding inputs of an AND gate 124, the output of which is connected to an incrementation input of a counter 129, the output counting value 130 of which is connected respectively to a first input of a comparator 131 and to an input terminal of a buffer circuit 132.

The second input of the comparator 131 is connected to the reading output of a register 133 in which a maximum counting value is registered for the counter CPTR.

The output of the counter 131 is connected to a control terminal 134 of the buffer circuit 132, so that an output terminal 135 of the buffer 132 copies out the value presented to its input 130 when the control terminal 134 is in high state, and transmits it to a denominator input of an arithmetic divisor circuit 136.

Register 112, which maintains the instantaneous value of estimation of the transmitted torque ECT, is supplied to a first input of an adder 137, a second input of which is connected to the reading output of a register 138 maintaining a partial accumulated sum value.

A writing input 139 of register 138 is connected to the instantaneous addition output 140 of the adder 137, so that at every instant register 138 contains a cumulative value of successive values of estimation of transmitted torque ECT_k during positive evolution of the counter CPTR 129.

The output 140 of the adder 137 is also connected to a numerator input of the arithmetic divisor circuit 136 so that, when the output signal 134 of the comparator output passes to the high state, the value accumulated by the adder 137 is divided by the value of the counter 129 and so that this cumulative value is supplied on output to a register 141 maintaining a transmitted torque estimation value with offset according to the principle of the algorithm of FIG. 8.

Figure 10:
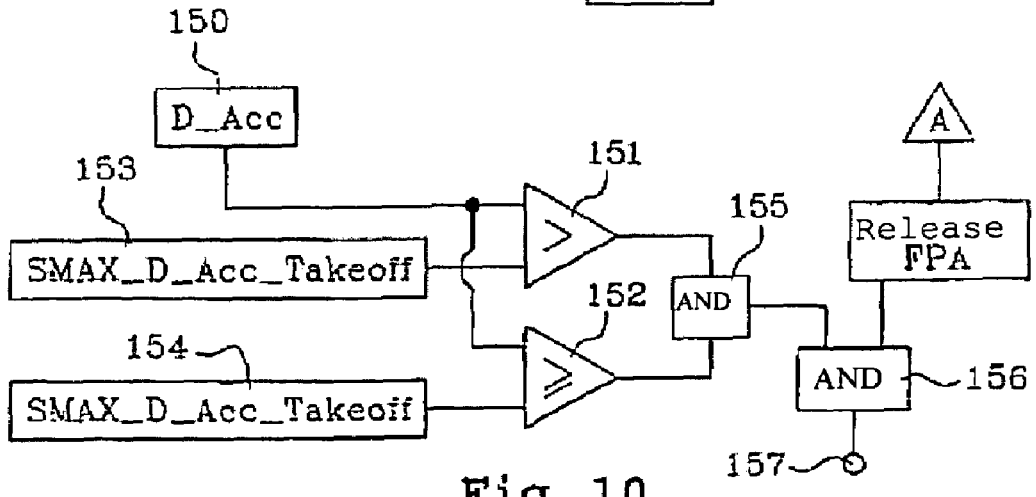
FIG. 10: a means making it possible to detect an abandonment by the driver of an attempt to start on a hill.

On FIG. 10 another circuit is represented, which uses an arrangement of the invention making it possible, by means of the information supplied by the sensor of degree of depression of the accelerator pedal, to produce information concerning the activity of the driver.

In one embodiment the circuit measuring the activity of the driver in the invention makes it possible to reject release of the parking brake in case of lifting of the accelerator pedal. In such a situation, lifting of the accelerator pedal can be considered as indicating the driver's abandonment of the effort to start.

In another embodiment, a filtering of too marked a rise of the accelerator pedal is added, considering that the detection of a time derivative of the angle of depression of the accelerator pedal is a measurement of a first starting action of the engine.

For that purpose the device of the invention contains a register 150 in which is maintained the instantaneous value of time derivative D_Acc of the degree of depression THETA_Acc of the accelerator pedal produced by means of the aforesaid circuit 120 on FIG. 9.

The reading value of register 150 is transmitted to the first inputs of two comparators, 151 and 152 respectively, the second inputs of which are respectively connected to reading outputs of registers 153 and 154. Register 153 maintains a lower threshold value Smin_D_Acc_TakeOff, characteristic of an upper limit of rate of depression of the accelerator pedal. If the time derivative D_Acc is less elevated than the registered value, the comparator 151 produces an active value at its output, which is transmitted to a first input of an AND gate 155. Likewise, if that time derivative D_Acc is less than or equal to a lower threshold value Smax_D_Acc_TakeOff, registered in register 154, the comparator circuit 152 passes to the active state and places its output connected to the second input of the AND gate 155 at the active value.

The output of the AND gate 155 is connected to a first input of a second AND gate 156, a second input of which is connected to the output terminal 100 of the circuit of FIG. 7. The authorization to release the Automatic Parking Brake is then presented to the output 157 of the circuit of FIG. 10 if the output of the AND gate 155 is active at the same time as the output terminal 102.

The invention also provides a means of detecting a hillside starting demand when the engine is not engaged, without, however, the presence of a sensor of degree of depression of the clutch pedal or of the state of engagement.

For that purpose, according to the invention, two maps 163 and 164 respectively representing the degree of depression of the accelerator pedal and the transmitted torque estimation are made upon initialization of the computer. The bases of these two maps make it possible to establish whether the engine is disengaged from the driving wheels or whether the thermal engine is mechanically connected to the driving wheels.

For that purpose, several maps can be loaded, as a function notably of the type of driver entered in a driver identification register, or as a function of the type of vehicle when the circuit of the invention is intended to equip different vehicles of a line of the same manufacturer.

Figure 11:
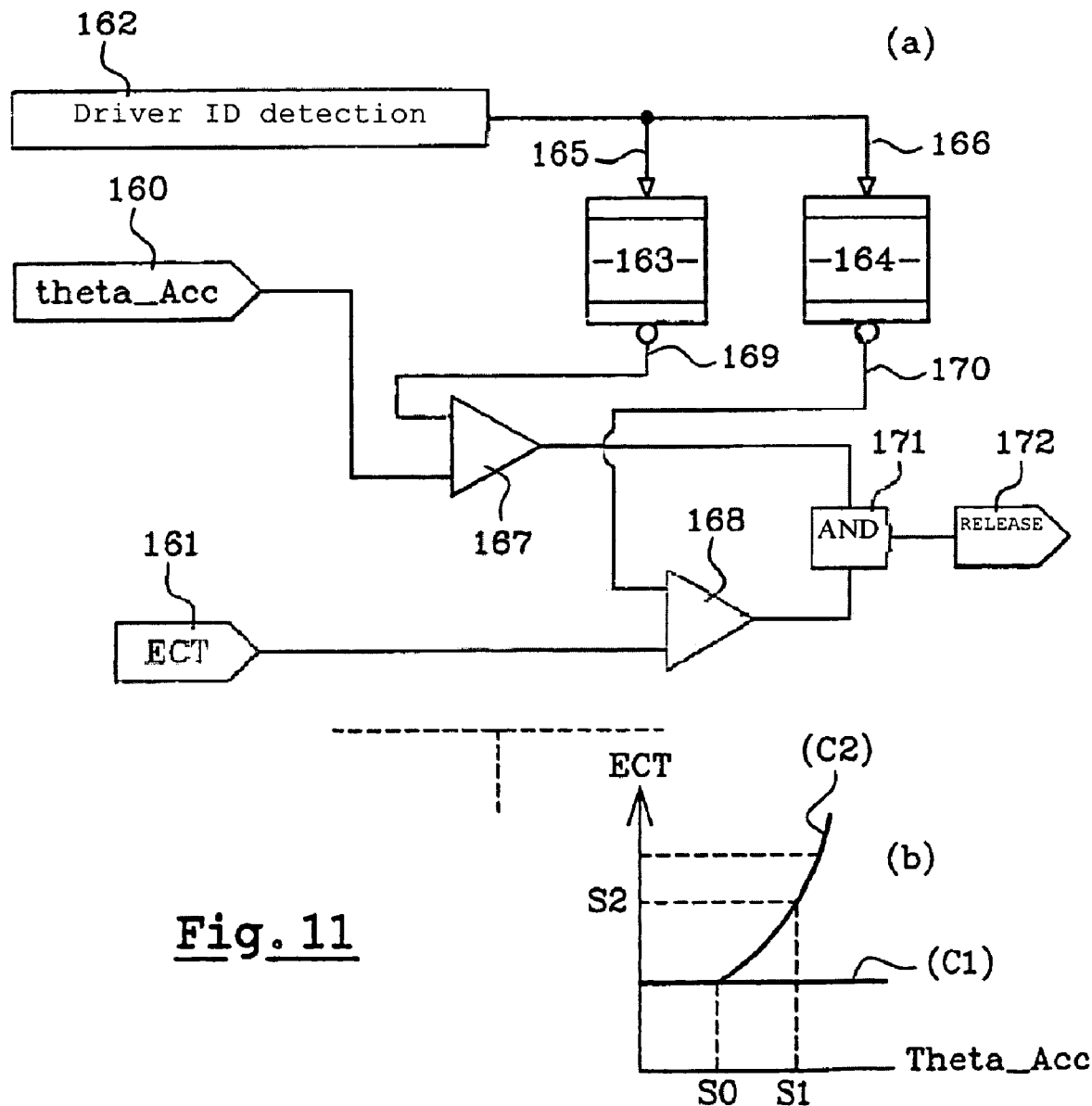
FIG. 11: a means making it possible to take into account the behavior of different drivers on a given vehicle.

The circuit of the embodiment of FIG. 11 essentially contains two access registers, namely:
  a register 160 for maintaining the instantaneous value of the degree of depression of the acceleration pedal THETA_Acc, and
  a register 161 for maintaining the instantaneous value of estimation of the transmitted torque ECT.

Furthermore, a module 162 for detection of the identification of the driver and/or of the vehicle makes it possible to determine what map to use on executing the method of the invention. The circuit or module 162 for detection of the identification of the driver and/or vehicle contains a control output line which is connected to respective control inputs 165 and 166 of a first map memory 163 and of a second map memory 164. The first map memory 163 contains a list of threshold values of the degree of depression of the accelerator pedal, which makes it possible to distinguish whether the driver is in engagement phase or not, that threshold value being determined by detection of the type of driver and/or vehicle of module 162.

The second map memory 164 contains a threshold value from which the vehicle can be considered engaged on the transmitted torque estimation CT. For that purpose, the registers 160 and 161 are connected to first inputs of a first comparator 167 and a second comparator 168, the second inputs of which are respectively connected to output 169 of the first map memory 163 and output 170 of the second map memory 164. The outputs of the two comparators 167 and 168 are connected to inputs of an AND gate 171, the output of which is connected to a release command 172.

The release command 172 can be combined with the release command coming from the output 157 of the circuit of FIG. 10 and/or from the output 100 of the circuit of FIG. 7.

In part B of FIG. 11 the diagrams of evolution of the transmitted torque estimation ECT is represented in ordinates as a function of the angle of depression THETA_Acc of the accelerator. The transmitted torque estimation is roughly constant at a very low value in the direction of rotation of the engine along a curve C1, when the power unit is idle, that is, when the clutch is not activated. The curve of evolution of the transmitted torque estimation ECT is represented by line C1 and, in general, involves a range of values not dependent on the angle of depression of the accelerator of several Newtonmeters.

In a second type of curve like curve C2, from a threshold SO of depression of the accelerator pedal, the transmitted torque estimation increases very rapidly. Thus, it is possible to determine a threshold S1 from which one can begin testing the transmitted torque estimation and a threshold S2 of transmitted torque above which one can be sure that the thermal engine is engaged on the driving wheels of the vehicle.

Those values S1 and S2 are respectively registered in the first map memory 163 and the second map memory 164 according to the type of vehicle or type of driver or identification thereof for a given vehicle.

Figure 12:
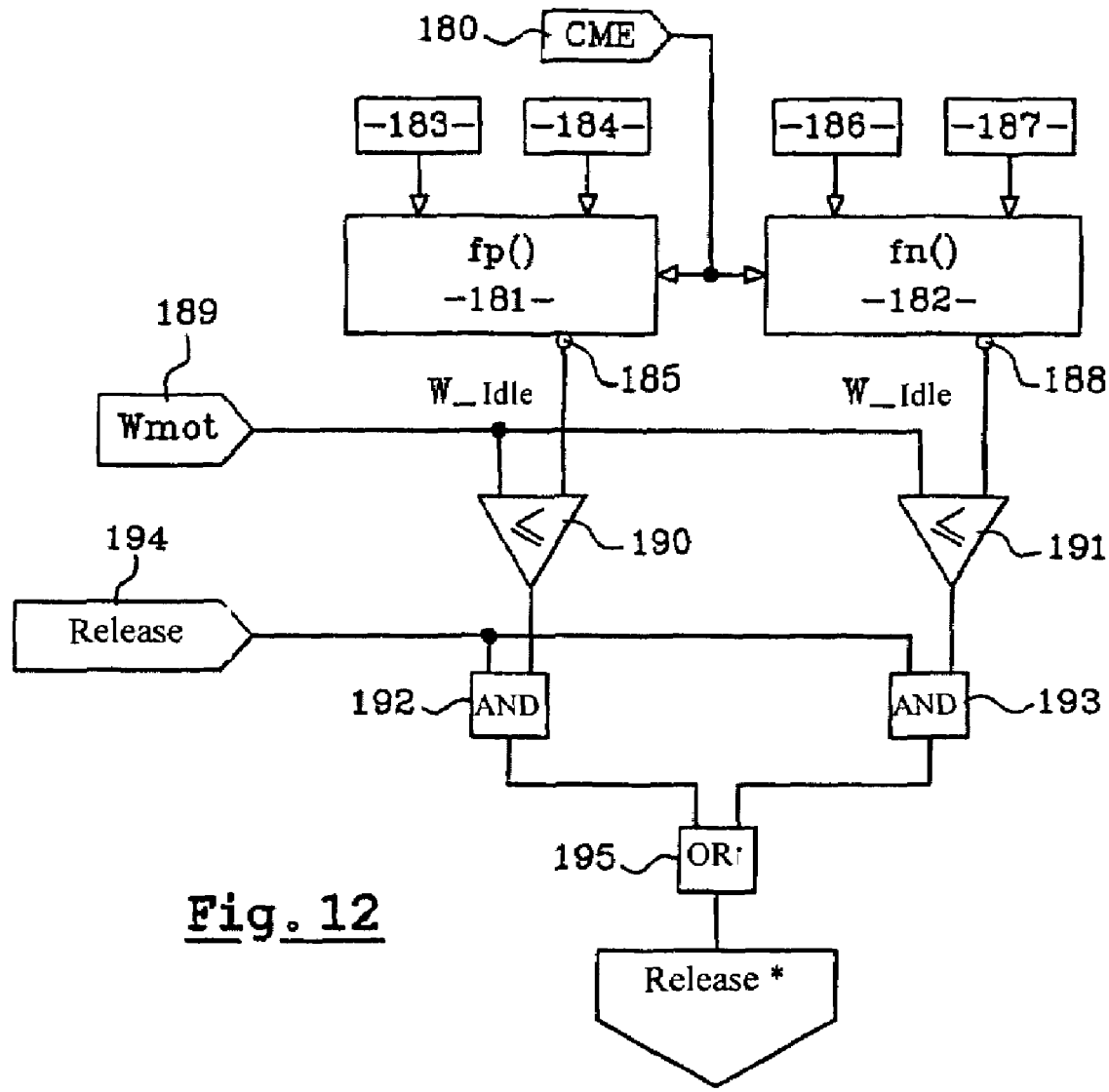
FIG. 12: a means for detecting a speed of the idle driving engine.

On FIG. 12 a means making it possible to detect idling speed when the vehicle is idling is represented.

The principle of that part of the invention consists in using the estimated engine torque information Cme and integrating the information in order to estimate the speed of the power unit and to determine whether it is idling. The estimated idle speed Wm_0 can then be compared to the real engine speed Wm and if it remains less than the idle speed Wm_0, it can be deduced that the vehicle is not in idle and a release can then be authorized.

In one embodiment the circuit of FIG. 12 contains an input register 180 in which an estimated engine torque value Cme produced on the engine computer is maintained. The estimated engine torque value 180 is transmitted to first inputs of two modules, 181 and 182 respectively, in which two respective functions are performed, fp( ) estimation of idle speed in rotation with a positive estimated engine torque CME and fn( ) estimate of idle speed in rotation with a negative estimated engine torque CME.

Module 181 makes it possible to estimate an idle speed value according to the estimated engine torque Cme presented at the terminal or register 180 and according to a pair of parameters estimated in advance through successive idle acceleration tests on a sampling of vehicles corresponding to the type of vehicle on which the device of the invention is mounted. In a first register 183 a gain applied to the estimated engine torque is registered, that is, the value G_Cme_PV in idle. In a second register 184 an offset on the estimated engine torque value in idle position is registered, that is, Offset_Cme_PV. The function fp( ) registered in the calculation module 181 uses the three arguments Cme of register 180, G_Cme_PV of register 183 and Offset_Cme_PV of register 184.

At the output terminal 185 of the calculation module 181 of function fp( ) an estimated idle speed value W_vide_p [W_idle_p] equal to a given value of function fp( ) applied to the three input arguments 180, 183 and 184 is presented according to the equation:

$$W\_vide\_p = fp(G\_Cme\_PV, \text{Offset}\_Cme\_PV, Cme).$$

In one particular embodiment, the function fp( ) is defined by the equation:

$$W\_vide\_p = G\_Cme\_PV \times Cme + \text{Offset}\_Cme\_PV.$$

Module 182 makes it possible to estimate an idle speed value according to the estimated engine torque Cme presented at the terminal or register 180 and according to a pair of parameters estimated in advance through successive idle acceleration tests on a sampling of vehicles corresponding to the type of vehicle on which the device of the invention is mounted. In a first register 186 a gain applied to the estimated engine torque Cme is registered, that is, the value G_Cme_NV in idle. In a second register 187 an offset on the estimated engine torque value in idle position is registered, that is, Offset_Cme_NV. The function fn( ) registered in the calculation module 181 uses the three arguments Cme of register 180, G_Cme_NV of register 186 and Offset_Cme_NV of register 187.

At the output terminal 188 of the calculation module 182 of function fn( ) an estimated idle speed value W_vide_n [W_idle_n] equal to a given value of function fn( ) applied to the three input arguments 180, 186 and 187 is presented according to the equation:

$$W\_vide\_n=fn(G\_Cme\_NV, \text{Offset}\_Cme\_NV, Cme).$$

In one particular embodiment, the function fn( ) is defined by the equation:

$$W\_vide\_n=G\_Cme\_NV \times Cme+\text{Offset}\_Cme\_NV.$$

The circuit of FIG. 12 then contains a register 189 in which the instantaneous value of the engine speed is maintained and which is supplied to first inputs, of a first comparator 190 and of a second comparator 191 respectively, the second inputs of which are respectively connected to the output 185 of module 181 and to the output 188 of module 182. The comparators 190 and 191 switch and pass to the active state when the engine speed is less than the estimated values of W_vide_n or W_vide_p, according to the type of speed in progress on the thermal engine of the vehicle. The outputs of the comparators 190 and 191 are connected to first inputs of AND gates 192 and 193, the second inputs of which are respectively connected to the reading output of a register 194 in which an active value of release of the Automatic Parking Brake of the invention is maintained. The outputs of the AND gates 192, 193 are connected to inputs of an OR gate 195 the output of which is placed on an output register which maintains a release value on detection of idle speed.

Figure 13:
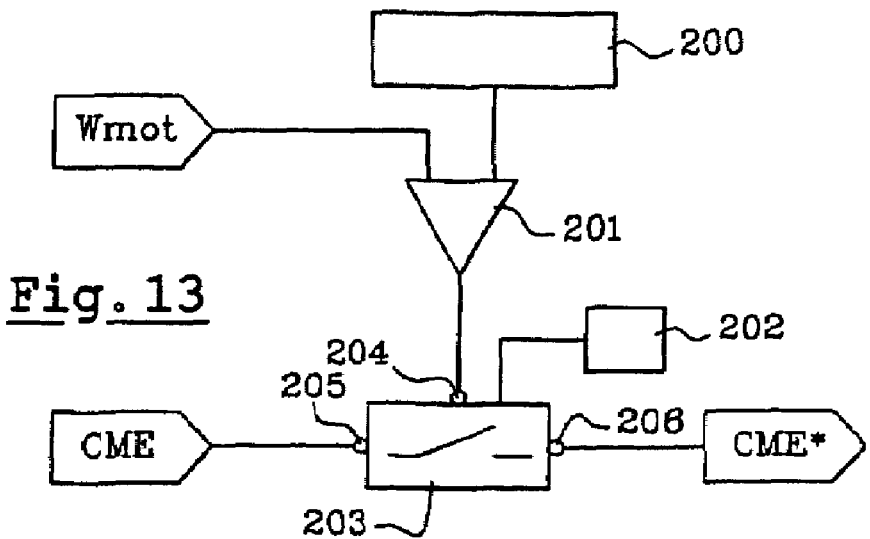
FIG. 13: a means for detecting the speed saturation.

On FIG. 13 an embodiment of a circuit for executing a stage of the method of the invention is represented. On development of the invention, the inventors recognized that the injection system equipping the thermal engine of the power units, on high speeds, that is, when the rate of rotation of the engine is high, might be cut off suddenly. Now, the module which is associated with the power unit and transmits to the bus 1 the estimated average torque value Cme used on the computer of the invention to elaborate the release command becomes erroneous. In that situation, the method of the invention consists in replacing the value representing the estimated average torque Cme of the thermal engine with a particular correction value on saturation.

For that purpose, the circuit of FIG. 13 contains an input terminal Wmot which receives a value representing the speed and a register 200 maintaining a threshold value Smax_Wm_ saturation beyond which cutoff of the injection system can take place.

Both of the said values are transmitted to the input terminals of a comparator 201, the output of which is connected to the input 204 of a switching circuit 203, a first input terminal 205 of which receives a value representing the estimated average torque Cme coming from the computer associated with the power unit and a second input terminal of which is connected to a corrected estimated average torque value on speed saturation. When the output terminal of the comparator 201 passes to the active stage because the engine speed has exceeded the prefixed threshold of the register 200, the correction value of register 202 is presented at the output 206 of the switching circuit 203 rather than the value Cme.

The method of the invention can also include extra options. In particular, the method of the invention finds an application in the situation of a horizontal start, the vehicle being stopped on a horizontal terrain. Such an operation can be implemented by means of the device of the invention on configuration of the vehicle on production, maintenance or on detection of the type of driver or of the driver when the latter sits down in the vehicle.

The "horizontal" character of the terrain is defined by a test to determine whether the signal representing measurement of the angle of slope is less, in absolute value, than a threshold of angle of inclination or slope noted Smin_Slope_NonZero, said threshold being registered in an angle of slope threshold register, and said signal being produced by the slope sensor 27 (FIG. 1).

In that operation the method of the invention consists in producing a release command of the parking brake on the sole determination that the transmitted torque estimation ECT is higher than the predetermined threshold ECTthreshold and, in particular, without testing a threshold on stepping on the accelerator pedal, as is required on starting on a hill, as described above.

For that purpose, the method of the invention consists in initializing a state variable on starting the vehicle to indicate that the accelerator pedal has not yet been depressed, the variable being represented by Acc_Was_NonZero=0.

In the course of execution of the method of the invention, if the "horizontal" starting operation is implemented, a variable representing the state of rest of the engine, a variable represented by Idle, is in the False state ("0") when one of the following four conditions already described at least is not true:

$$Wm \leq Smax\_Wm\_Idle$$

$$ABS(D\_Wm) \leq Smax\_D\_M\_idle$$

$$THETA\_Acc \leq Smax\_acc\_idle$$

$$D\_Acc \leq 0.$$

And which then passes again to the True state ("1") when the four conditions are present.

According to the method of the invention, the variable Acc_Was_NonZero remains at "1" as soon as the accelerator is pressed and until the Idle variable returns to "1". The method of the invention then consists of authorizing "horizontal" starting when the variable Acc_Was_NonZero equals "0";

It is then sufficient to test that the transmitted torque estimation ECT is higher than a threshold value ECTthreshold in order to authorize release of the Automatic Parking Brake and thus ensure starting of the vehicle by keeping it in a certain range of acceleration.

The circuit of the device of the invention using the "horizontal" starting operation essentially comprises:

- a circuit for activating the horizontal starting operation on configuration of the vehicle on production, maintenance or on detection of the type of driver or of the driver when the latter sits down in the vehicle, which produces a logic signal at "0" if the operation is not implemented and at "1" if the operation is implemented;
- a "horizontal" position detection circuit in order to detect that the signal representing the angle of inclination produced by the slope angle sensor 27 is at absolute value less than a threshold value registered in a suitable register and representing the "horizontal" position limit;
- a first AND gate to combine the output signals of the circuit for activating the horizontal starting operation and the "horizontal" position detection circuit;
- a circuit for elaborating the variable Acc_Was_NonZero which comprises a comparator of the degree of depression of the accelerator pedal at a very low predetermined depression threshold and a reset circuit as soon as the Idle variable coming from the rest of the starting device of the invention returns to "0";

a circuit to test the value of the transmitted torque estimation ECT coming from the rest of the starting device of the invention at a threshold value ECTthreshold and to produce a release command of the Automatic Parking Brake;

a second AND gate for combining the "horizontal" release command coming from the circuit to test the value of the transmitted torque estimation ECT at the output for the first AND Gate and the output of which is connected to the electric motor controller of the Automatic Parking Brake.

The horizontal release operation without accelerator offers an improvement of comfort of the starting operation of the parked vehicle. Without acceleration, starting takes place more slowly and comfort is improved.

In a first variant the "horizontal" starting operation is extended to the case of starting on descent in first gear.

For that purpose, the "horizontal" starting operation is also activated when a negative slope is detected and first gear is engaged.

For that purpose, the device of the invention contains:

a circuit for activating the starting operation "on descent in first gear," upon configuration of the vehicle on production, maintenance or upon detection of the type of driver or of the driver when the latter sits down in the vehicle, which produces a logic signal at "0" if the operation is not implemented and at "1" if the operation is implemented;

a circuit for detection of "descent in first gear," in order to detect that the signal representing the angle of inclination produced by the angle of slope sensor 27 is less than a negative threshold value registered in a suitable register and representing the limit of "descent in first gear";

a third AND gate for combining the output signals of the circuit for activating the starting operation "on descent in first gear" and of the circuit for detection of "descent in first gear";

a fourth AND gate for combining the output of the third AND gate and the output of the circuit for testing the value of the transmitted torque estimation ECT coming from the rest of the starting device of the invention at a threshold value ECTthreshold and for producing a release command of the Automatic Parking Brake "on descent in first gear".

In a second variant the "horizontal" starting operation is extended to the case of starting on descent in "reverse".

For that purpose, the "horizontal" starting operation is also activated when a positive slope is detected and the reverse gear is engaged.

For that purpose, the device of the invention contains:

a circuit for activating the starting operation "on descent in reverse gear," upon configuration of the vehicle on production, maintenance or upon detection of the type of driver or of the driver when the latter sits down in the vehicle, which produces a logic signal at "0" if the operation is not implemented and at "1" if the operation is implemented;

a circuit for detection of "descent in reverse gear", in order to detect that the signal representing the angle of inclination produced by the angle of slope sensor 27 is greater than a positive threshold value registered in a suitable register and representing the limit of "descent in reverse gear";

a third AND gate for combining the output signals of the circuit for activating the starting operation "on descent in reverse gear" and of the circuit for detection of "descent in reverse gear";

a fourth AND gate for combining the output of the third AND gate and the output of the circuit for testing the value of the transmitted torque estimation ECT coming from the rest of the starting device of the invention at a threshold value ECTthreshold and for producing a release command of the Automatic Parking Brake "on descent in reverse gear".

In another embodiment, the vehicle being provided with a sensor for measurement of the depression of the all-or-nothing clutch pedal, the signal emanating from that sensor being at "1" when the clutch is open, "idling" of the vehicle is thus directly detected without the need to test the different situations in which the power unit has been separated from the driving wheels.

In another embodiment the method of the invention also involves a stage of detection of excess pitch. In a first application, the pitch sensor makes it possible to detect that, when the vehicle accelerates, the brakes are still locked and, therefore, to confirm in a subsequent stage a release command of the automatic parking brake. In a second application, the stage of detection of a pitch value is followed by a stage to prevent release of the Automatic Parking Brake in a starting position, if the pitch of the vehicle applied, for example, by too great a movement of the passengers of the vehicle exceeds a certain predetermined threshold.

For that purpose, the device of the invention contains a circuit for detecting excess pitch, the output of which is active if the excess pitch exceeds a threshold predetermined in a register. The output of the circuit for detecting excess pitch is combined by a reversing input of an AND gate, another input of which is connected to the output of the device previously described, on which is located the release command of the Automatic Parking Brake, and the output of the AND gate producing the release command of the Automatic Parking Brake outside of excess pitch.

The circuit for detecting excess pitch contains an input terminal that receives a signal produced by the angle of slope sensor 27, which presents sufficient resolution for detecting excess pitch. The angle of inclination detection signal is transmitted to the input of a circuit for producing a signal representing the time derivative of the angle of inclination detection signal, the output of which is connected to an input of a comparator, the other input of which is connected to a register maintaining an excess pitch threshold value. The output of the comparator is active when the derivative of the signal representing the angle of inclination of the sensor 27 is greater than the predetermined threshold.

In one embodiment, the excess pitch threshold value is produced by a generator of excess pitch threshold values as a function of the angle of inclination produced by the sensor 27.

In another embodiment the generator of excess pitch threshold values contains a first series of threshold values in a first starting direction and a second series of threshold values in a second starting direction.

The method of the invention also makes it possible to provide an operation of anticipation of the dynamics of starting. For that purpose, the method of the invention also includes a stage for determining a term of anticipation on the starting command of the Automatic Parking Brake as a function of predetermined anticipation values.

For that purpose, the method of the invention consists, upon execution of the method of elaboration of the release command of the Automatic Parking Brake already described, in also executing a stage of measurement of the degree of depression of the accelerator pedal Theta_Acc, then measuring a time derivative of the signal Theta_Acc of the degree of depression, that is, D_Acc, and comparing that instantaneous value of derivative D_Acc with a predetermined threshold Threshold_Anticipate, so that if the rate of variation of the degree of depression D_Acc is greater than a Threshold_Anticipate value, the incrementation loop of the transmitted torque estimation value ECT will be interrupted before the test 33 (FIG. 2) is true and in order to produce in advance the Automatic Parking Brake release command.

The device for use of the method of invention contains for that purpose a circuit for calculating the time derivative D_Acc of the signal Theta_Acc of the degree of depression supplied by the angle of slope sensor 27 (FIG. 1). The circuit for calculation of the derivative D_Acc contains an output which is connected to a first input of a comparator, the other input of which is connected to a generator of a predetermined Threshold_Anticipate value, so that its output is active if the Threshold_Anticipate value is exceeded. The output signal of the comparator is then transmitted to a first input of another AND gate, the second input of which is connected to a circuit for detecting that the transmitted torque estimation ECT is in the process of incrementation, for example, by detecting the evolution of the counter CPTR (83, FIG. 6). The output of the other AND gate is then used as anticipated release command of the Automatic Parking Brake.

In one particular embodiment, the predetermined threshold Threshold_Anticipate is a predetermined function dependent on the degree of slope measured by the angle of slope sensor 27 (FIG. 1).

The device for use of the invention contains for that purpose a generator of a predetermined threshold Threshold_Anticipate in the form of a table of threshold values addressed by the value of the degree of slope measured by the angle of slope sensor 27. The Threshold_Anticipate value is then transmitted to the aforementioned comparator of the device of the invention.

In an embodiment of the method of the invention, the operation of anticipation of the dynamics of starting also involves a stage for taking into account the response time of the electric motor equipping the Automatic Parking Brake as well as the different movements in the braking mechanism it activates.

In the method of the invention an anticipation of starting of the parking brake is provided for in order to take into account the dynamics of the driver and the response time of the electromechanical system. The response time of the electromechanical system is known through previous measurements and, if necessary, with a calibration procedure. Let Tr be the response time. At each instant the transmission torque estimation ECT and its time derivatives, like (d/dt)·ECT, are determined. Those time derivatives make it possible to take into account the driver's dynamism, the value of the first time derivative increasing with the driver's dynamism. According to the invention, a prediction stage is executed by extrapolation. In one embodiment an extrapolation or prediction is then made on the prediction value of the transmitted torque estimation by an equation of the form (at order 1):

$$ECT\_predicted(Tr)=ECT+Tr\times(d/dt)\cdot ECT.$$

In order to make a prediction, an operator must therefore receive on inputs:
- a characteristic value of response time Tr registered, for example, in a suitable memory calibrated, if need be, by a response time processor of the automatic parking brake system;
- at least one value in the course of a transmitted torque estimation ECT_current.

The operator then includes a derivator which contains in known manner:
- a memory of a preceding acquisition of a transmitted torque estimation ECT_old and, in one particular embodiment, a memory of a time coefficient Ta proportional to the time separating two acquisitions or transmitted torque estimations;
- a subtractor for carrying out the operation ECT_current−ECT_old;
- a divisor for carrying out the time derivation proper through an operation of the form (ECT_current−ECT_old)/Ta.

The operator also includes:
- a multiplier, of which one input is connected to the memory of the response time Tr and the other input is connected to the output of the divisor producing the value (d/dt)·ECT and the output of which produces the value Tr×(d/dt)·ECT;
- an adder for carrying out the operation ECT_predicted (Tr)=ECT_current+Tr×(d/dt)·ECT.

The anticipation can then, according to the method of the invention, be carried out by execution of a test, the threshold of which, S_min_predicted and/or S_max_predicted, is predetermined. Such a test is in the form: S_min_predicted<ECT_predicted<S_max_predicted, so that if the test is positive, an anticipated release command of the automatic parking brake is generated on output of the control computer 5 of the Automatic Parking Brake.

The device of the invention for using the method of the invention contains at least:
- one memory of a threshold value S_min_predicted and/or S_max_predicted of anticipation release test for registering in fixed or calibratable manner as a function of a calibration processor of starting anticipation thresholds;
- one comparator of the output value of the aforementioned operator in order to make a prediction on the engine torque estimation value to at least one of said threshold values S_min_predicted and/or S_max_predicted, so that an anticipated release authorization signal to the Automatic Parking Brake will be produced if the comparator is activated.

In one embodiment the device of the invention consists of a processor with a logic architecture in four blocks, namely:
- an acquisition block of input data, among which are the engine speed Wm, the speed of the vehicle Vv, the angle of slope, the estimated average torque Cme, and the degree of depression of the accelerator pedal THETA_Acc, notably sampled on the CAN 1 bus;
- a signal treatment block applied to input data, particularly carrying out digital filtering of all or part of the input data and making scale or unit corrections;
- a block for initialization of the parameters of the method of the invention, involving notably the threshold values and initializations of the counters;
- a block for execution of the method in order to generate a release command of the Automatic Parking Brake.

The invention claimed is:

1. A method of assistance in starting a vehicle including a power unit and an automatic parking brake equipped with a mechanism of executing a command to release or deactivate the automatic parking brake, comprising, at least after one starting phase of the power unit:
   - estimating a transmitted torque value required to balance the vehicle on a slope;
   - executing in a loop an incremental calculation comprising:
     - reading an effective average torque value (Cme) associated with a dynamic stage of the power unit,
     - reading an engine speed value (Wm),
     - calculating a time derivative of the engine speed,
     - determining a moment of inertia of the power unit (Jmot) and calculating a load moment in a form of a product of the moment of inertia of the power unit by the time derivative of the engine speed, and determining an estimation of torque actually transmitted at a given moment (ECT) according to an equation: ECT=Cme−Jmot×dWm/dt, wherein the loop is executed while the estimation of the torque actually transmitted is insufficient to surpass the estimation of the transmitted torque required to balance the vehicle on the slope; and after the executing, producing a starting or deactivation command of the automatic parking brake.

2. A method according to claim 1, further comprising resynchronizing the reading the effective average torque value and the reading the engine speed value, so that each pair of the values corresponds to a same time interval.

3. A method according to claim 2, further comprising adding a predetermined delay, equal to three periods of passage to a Top Dead Center of a thermal engine of the power unit, on a value of the resynchronization of the estimated average torque value, to take into account a waiting time for filling of a manifold and for ignition.

4. A method according to claim 2, wherein the resynchronization includes applying the resynchronization on derivative value (D_Wm) of the engine speed (Win) between two samples separated by a resynchronization time according to equation: D_Wm=[Wm(8)−Wm(1)]/time, in which time determines a resynchronization period and Wm(1) and Wm(8) values of beginning and end of a resynchronization period.

5. A method according to claim 1, wherein the estimating the transmitted torque required to balance the vehicle on the slope comprises:

comparing the estimation of the transmitted torque required to balance the vehicle on the slope to a predetermined threshold value;

if the predetermined threshold value is exceeded, testing an output value of a counter, incremented on each transmitted torque estimation stage relative to the predetermined threshold value, if the predetermined threshold value is exceeded, producing a command authorizing release of the automatic parking brake.

6. A method according to claim 5, wherein the estimating the transmitted torque required to balance the vehicle on the slope further comprises executing a predetermined offset, so as to reduce a disturbing effect of starting and/or stopping of some secondary consumers of energy or power supplied by a thermal engine, by carrying out the operation:

$$ECT\_Corr\_k = ECT\_k + g(\text{Consumers}),$$

to determine a range in which the engine can be considered idling and a range during which an offset on the estimating the transmitted torque can be executed.

7. A method according to claim 6, wherein the executing the offset is carried out following a test in a course of which four conditions are combined:

$$Wm \leq Smax\_Wm\_Idle,$$

$$ABS(D\_Wm) \leq Smax\_D\_M\_idle,$$

$$THETA\_Acc \leq Smax\_acc\_idle,$$

$$D\_Acc \leq 0,$$

conditions under which:

Smax_Wm_idle represents a threshold value below which the engine speed indicates that the engine is at rest or idling;

Smax_D_M_idle represents a threshold value below which absolute value ABS(D_Wm) of the time derivative of the engine speed D_Wm indicates that the engine is at rest or idling;

Smax_acc_idle represents a threshold value below which degree of depression of the accelerator pedal THETA_Acc indicates that the engine is at rest or idling;

D_Acc represents time derivative of the degree of depression THETA_Acc of the accelerator pedal, which is negative when the driver lifts a foot from the accelerator pedal;

so that, if the test is negative, the control returns to initialization of a counter, the power unit being deemed unconnected to driving wheels of the vehicle;

and so that, if the test is positive, the control determines whether the counter is below a predetermined threshold value;

so that if the counter is below the predetermined threshold value, an initially zero offset value, when the counter is initialized at the stage, is increased by a value of the current estimation of the transmitted torque;

then, the value of the counter is incremented by one step, and the control is returned to the test; and so that, if the counter is not below the predetermined threshold value, the offset value is transmitted to a routine of calculation of an offset value of the transmitted torque estimation, an offset value noted offset_ECT which is equal to a ratio of the offset value calculated to the value CPTR_threshold of the counter.

8. A method according to claim 1, further comprising producing a driver activity report, so that release of the automatic parking brake will be refused in case of lifting of an accelerator pedal of the vehicle.

9. A method according to claim 1, further comprising saturation detection of a high-speed thermal engine of the vehicle, so that release of the automatic parking brake is prevented on saturation.

10. A method according to claim 1, further comprising an excess pitch detecting for preventing release of the automatic parking brake in a starting situation if the pitch of the vehicle exceeds a certain predetermined threshold.

11. A method according to claim 1, wherein the estimating of the transmitted torque required to balance the vehicle on the slope includes calculating a static model of the vehicle on the slope from a measurement of an angle of inclination delivered by a slope sensor and knowledge of a given value representative of a transmission speed.

12. A method according to claim 11, wherein when the measurement of the angle of inclination is less than a given threshold, the estimation of the transmitted torque required to balance the vehicle on the slope is increased by a given value.

13. A method according to claim 12, wherein the given value of increase of the estimation of the transmitted torque required to balance the vehicle on the slope depends on the measurement of the angle of inclination.

14. A method of assistance in starting a vehicle including a power unit and an automatic parking brake equipped with a mechanism of executing a command to release or deactivate the automatic parking brake, comprising, at least after one starting phase of the power unit:

estimating a transmitted torque value required to balance the vehicle on a slope;

executing in a loop an incremental calculation of an estimation of torque actually transmitted at a given moment, while the estimation of the torque really transmitted is insufficient to surpass the estimation of the transmitted torque required to balance the vehicle on the slope;

after the executing, producing a starting or deactivation command of the automatic parking brake; and detecting a release demand when the power unit is not engaged, wherein the detecting includes, without using any sensor of depression of a clutch pedal of the vehicle, detecting an engaged state by two maps of the estimation of torque transmitted as a function of a degree of depression of an accelerator pedal of the vehicle respectively established when wheels of the vehicle are engaged and when the wheels are disengaged, and comparing the value of the estimation of torque transmitted to each map value addressed by measurement of the degree of depression of the accelerator pedal to produce, if comparison to the first map is positive, a characteristic report of a disengaged state, and if the comparison to the second map is positive, to produce a characteristic report of an engaged state.

15. A method of assistance in starting a vehicle including a power unit and an automatic parking brake equipped with a mechanism of executing a command to release or deactivate the automatic parking brake, comprising, at least after one starting phase of the power unit:

estimating a transmitted torque value required to balance the vehicle on a slope;

executing in a loop an incremental calculation of an estimation of torque actually transmitted at a given moment, while the estimation of the torque really transmitted is insufficient to surpass the estimation of the transmitted torque required to balance the vehicle on the slope;

after the executing, producing a starting or deactivation command of the automatic parking brake; and detecting idling speed, including:

comparing information on estimated engine torque (Cme) to two functions of estimation of the idling speed in rotation with an estimation of positive transmitted torque fp( ) and in rotation with an estimation of negative transmitted torque fn( ), applying to the function fp( ) an idle gain applied on the estimated engine torque, an offset on the estimated engine torque value in an idle position, and the estimated engine torque to produce an idling speed value in rotation with an estimation of positive transmitted torque, applying to the function fn( ) an idle gain applied on the estimated engine torque, an offset on the estimated engine torque value in an idle position, and the estimated engine torque to produce an idling speed value in rotation with an estimation of negative transmitted torque, comparing an engine speed value to determine whether a positive or negative idling speed is present, on rotation with an estimation of positive transmitted torque or with an estimation of negative transmitted torque, and authorizing release of the automatic parking brake only if no idling speed is detected.

16. A method of assistance in starting a vehicle including a power unit and an automatic parking brake equipped with a mechanism of executing a command to release or deactivate the automatic parking brake, comprising, at least after one starting phase of the power unit:

estimating a transmitted torque value required to balance the vehicle on a slope;

executing in a loop an incremental calculation of an estimation of torque actually transmitted at a given moment, while the estimation of the torque really transmitted is insufficient to surpass the estimation of the transmitted torque required to balance the vehicle on the slope;

after the executing, producing a starting or deactivation command of the automatic parking brake; and producing a horizontal starting operation without a threshold on pressing an accelerator pedal of the vehicle, including:

producing a parking brake release command on sole determination that the estimation of the torque actually transmitted is higher than a predetermined threshold and without testing the threshold on pressing the accelerator pedal, initializing a starting state variable on starting up the vehicle, to indicate that the accelerator pedal has not yet been depressed, to 0, reading a rest variable representative of a state of rest of an engine of the vehicle, treating a stabilizing state variable so that the variable stays at 1 as soon as the accelerator has been pressed and until an idle variable returns to 1, and then authorizing horizontal starting when the starting state variable equals 0 and testing that the estimation of the torque actually transmitted is higher than the predetermined threshold value to authorize release of the automatic parking brake and thus ensure starting of the vehicle keeping the vehicle in a certain range of acceleration.

17. A method according to claim 16, further comprising extending the horizontal starting operation to a descending starting operation in first gear.

18. A method according to claim 16, further comprising extending the horizontal starting operation to a descending starting operation in reverse gear.

19. A method of assistance in starting a vehicle including a power unit and an automatic parking brake equipped with a mechanism of executing a command to release or deactivate the automatic parking brake, comprising, at least after one starting phase of the power unit:

estimating a transmitted torque value required to balance the vehicle on a slope;

executing in a loop an incremental calculation of an estimation of torque actually transmitted at a given moment, while the estimation of the torque really transmitted is insufficient to surpass the estimation of the transmitted torque required to balance the vehicle on the slope;

after the executing, producing a starting or deactivation command of the automatic parking brake; and determining a term of anticipation on the release command of the automatic parking brake dependent on predetermined anticipation values, which includes, upon elaboration of the automatic parking brake release command, also executing measuring a degree of depression of an accelerator pedal of the vehicle, and then measuring a time derivative of a signal of the degree of depression, and comparing the instantaneous derivative value with a predetermined threshold, so that if the time derivative of the signal of the degree of depression is greater than the predetermined threshold value, the incrementation loop of the estimation of the torque actually transmitted is interrupted before the estimation of the torque actually transmitted is sufficient to surpass the estimation of the torque required to balance the vehicle on the slop, to produce in advance the automatic parking brake release command.

* * * * *